United States Patent
Sato

(10) Patent No.: US 10,713,098 B2
(45) Date of Patent: Jul. 14, 2020

(54) INFORMATION PROCESSING APPARATUS AND COOKIE INFORMATION MANAGEMENT METHOD

(71) Applicant: CANON KABUSHIKI KAISHA, Tokyo (JP)

(72) Inventor: Masaaki Sato, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 16/276,313

(22) Filed: Feb. 14, 2019

(65) Prior Publication Data

US 2019/0286498 A1    Sep. 19, 2019

(30) Foreign Application Priority Data

Mar. 15, 2018 (JP) ................. 2018-048251

(51) Int. Cl.
*G06F 9/54* (2006.01)
*H04L 29/08* (2006.01)

(52) U.S. Cl.
CPC .............. *G06F 9/54* (2013.01); *H04L 67/146* (2013.01)

(58) Field of Classification Search
None
See application file for complete search history.

(56) References Cited

U.S. PATENT DOCUMENTS

| 2011/0167492 A1* | 7/2011 | Ghosh | G06F 9/54 |
| | | | 726/23 |
| 2015/0121085 A1* | 4/2015 | Zhao | H04L 67/02 |
| | | | 713/185 |

FOREIGN PATENT DOCUMENTS

JP    2014-164376 A    9/2014

* cited by examiner

*Primary Examiner* — Craig C Dorais
(74) *Attorney, Agent, or Firm* — Canon U.S.A., Inc., IP Division

(57) ABSTRACT

Stored cookie information is obtained from a first browser from among a plurality of browsers where each of the plurality of browsers stores respective cookie information. In a case where a second browser is used, the cookie information obtained from the first browser is passed to the second browser.

10 Claims, 22 Drawing Sheets

FIG.5A

| MFP APP ID | COMMON ENCRYPTION KEY FOR MFP APP |
|---|---|
| APP711 | OhVyoiuARmcu...... |
| APP712 | WasilDcQR6dYj...... |
| APP713 | tjoE1ijp321rAeh...... |
| ... | ... |

| | MFP APP ID | LICENSE ACCESS NUMBER | EXPIRATION DATE | DEVICE ID | LICENSE ID |
|---|---|---|---|---|---|
| 516 | APP711 | XXX-XXX-101 | INDEFINITE | — | — |
| 517 | APP712 | XXX-XXX-102 | INDEFINITE | DEV001 | LIC001 |
| 518 | APP713 | XXX-XXX-201 | 60 DAYS | DEV002 | LIC002 |
| | ... | ... | | ... | |

LICENSE ID: LIC002
MFP APP ID: APP712
DEVICE ID: DEV002
EXPIRATION DATE: 60
COMMON ENCRYPTION KEY FOR MFP APP: WasiIDcQR6dYj······

FIG.6B

901 — MFP APP ID: APP712
902 — APPLICATION NAME: DEDICATED TO XX
903 — WEB APPLICATION URL: https://www.server.com/xxx/serverplace
904 — CONTEXT ROOT URL: http://www.zzzzz.com/webapp01
905 — DEVICE INFORMATION LIST: user_id, device_id, device_model, encrypt_pdf, print_service_ver
...

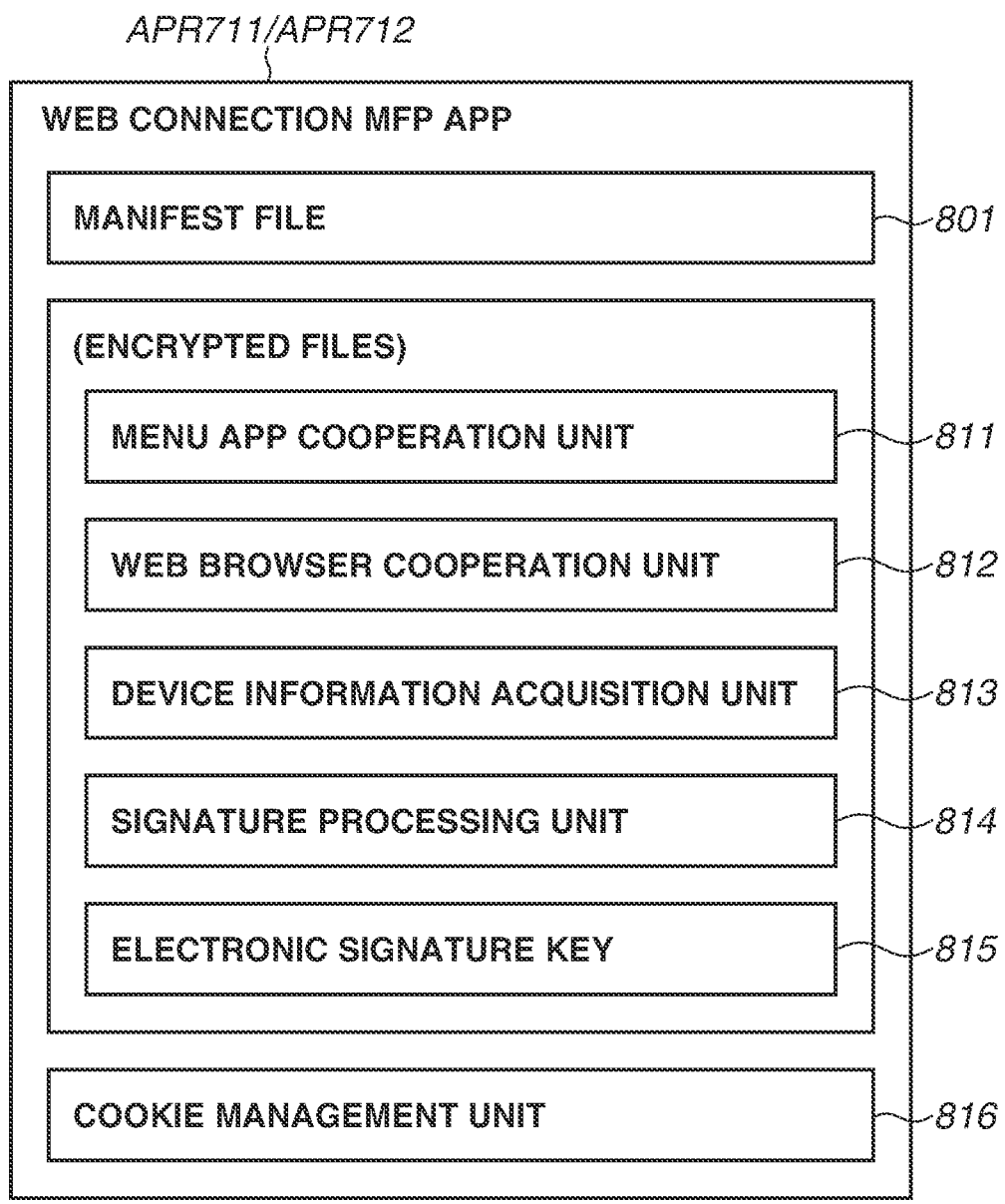

FIG.9A
[CONNECTION APP MANAGEMENT TABLE]

| WEB CONNECTION MFP APP | CALL FLAG |
|---|---|
| WEB CONNECTION MFP APP APP711 | |
| WEB CONNECTION MFP APP APP712 | ○ |

FIG.9B

| INSTALLED BROWSER | DEFAULT BROWSER |
|---|---|
| WEB BROWSER 705 | ○ |
| WEB BROWSER 706 | |

FIG.9C

| USER | PASSWORD | LOGIN |
|---|---|---|
| UserA | *** | ○ |
| UserB | *** | |
| UserC | *** | |

FIG.9D
[COOKIE MANAGEMENT TABLE OF MFP APP APP711]

| USER | PASSWORD | Key | Value |
|---|---|---|---|
| UserA | https://www.globalserver.com/zzz/sampleplace | loginID | UserAA |
| UserA | https://www.globalserver.com/zzz/sampleplace | loginPwd | passwordAA |
| UserA | https://www.globalserver.com/zzz/sampleplace/upload | uploadDoc | FILENAME 1 |
| UserA | https://www.globalserver.com/zzz/sampleplace/upload2 | choice | LARGE |
| UserB | https://www.globalserver.com/zzz/sampleplace | loginID | UserBB |
| UserB | https://www.globalserver.com/zzz/sampleplace | loginPwd | passwordBB |

FIG.9E

| Key | Value |
|---|---|
| loginID | UserA |
| loginPwd | passwordA |
| document | DOCUMENT NAME A |
| choice1 | LARGE |

FIG.17A

| INSTALLED BROWSER | DEFAULT BROWSER | TYPE |
|---|---|---|
| WEB BROWSER 705 |  | 1 |
| WEB BROWSER 706 | ○ | 2 |

FIG.17B

[COOKIE MANAGEMENT TABLE OF MFP APP APP712]

| USER | URL | Key | Value | TYPE |
|---|---|---|---|---|
| UserA | https://www.server.com/xxx/serverplace | loginID | UserA | 1 |
| UserA | https://www.server.com/xxx/serverplace | loginPwd | passwordA | 1 |

FIG.17C

| URL | Key | Value | TYPE |
|---|---|---|---|
| https://www.server.com/xxx/serverplace | loginID | UserA | 1 |
| https://www.server.com/xxx/serverplace | loginPwd | passwordA | 1 |
| https://www.server.com/xxx/serverplace/gyoumuA | document | DOCUMENT NAME A | 1 |
| https://www.server.com/xxx/serverplace/gyoumuB | choice1 | LARGE | 1 |

FIG.18

| | MFP APP ID (1801) | LICENSE EXPIRATION DATE (1802) | LICENSE ID (1803) | LICENSE ID HISTORY (1804) |
|---|---|---|---|---|
| 1811 | APP711 | INDEFINITE | LIC010 | — |
| 1812 | APP712 | 2016/12/10 | LIC002 | LIC003 |
| 1813 | APP713 | INDEFINITE | LIC011 | — |
| | ... | | ... | ... |

INFORMATION PROCESSING APPARATUS AND COOKIE INFORMATION MANAGEMENT METHOD

BACKGROUND

Field

The present disclosure relates to an information processing apparatus and a cookie information management method.

Description of the Related Art

Some multifunction peripherals (MFPs) include a copy function and/or a transmission function, and some have a browser installed. Such an image forming apparatus connects to a network-connected web server having a specific address and displays an operation screen of a web application by the installed browser so that a user can operate the operation screen.

Japanese Patent Application Laid-Open No. 2014-164376 discusses a technique where when communication with a web server is performed using a browser, the user inputs entries into input fields (for example, an authentication identifier (ID) and a password for login) of a page returned from the web server, and transmits a request to the web server. The browser can store input information about the authentication ID and password as cookies to automatically complete the input information about the authentication ID and password in a the next request.

A plurality of browsers can be installed on an image forming apparatus. Input information about an authentication ID and a password stored as cookies by a browser are used by the browser itself, and there has been no mechanism for using such input information by a different browser. The user then needs to input the authentication ID and password browser by browser, which has resulted in poor user convenience.

SUMMARY

The present disclosure is directed to providing a technique for improving user convenience of an apparatus on which a plurality of browsers is installed by enabling cookie information about one browser to be used by another browser.

According to an aspect of the present disclosure, an information processing apparatus includes at least one memory storing a plurality of browsers wherein each of the plurality of browsers stores respective cookie information, and at least one processor that when executing a program causes the information processing apparatus to obtain the stored cookie information from a first browser from among the plurality of browsers and manage the cookie information, wherein, in a case where a second browser from among the plurality of browsers is used, the stored cookie information obtained from the first browser is passed to the second browser.

Further features will become apparent from the following description of exemplary embodiments with reference to the attached drawings.

BRIEF DESCRIPTION OF THE DRAWINGS

FIG. 5A is a diagram illustrating an example of an MFP application management table according to the exemplary embodiment. FIG. 5B is a diagram illustrating an example of a license management table.

FIG. 6A is a diagram illustrating an example of a license file. FIG. 6B is a diagram illustrating an example of a manifest file of a web connection MFP app.

FIG. 8 is a diagram illustrating a configuration of software modules of a web connection MFP app according to the exemplary embodiment.

FIGS. 9A, 9B, 9C, 9D and 9E are diagrams each illustrating an example of a management table according to the exemplary embodiment.

FIGS. 17A, 17B, and 17C are diagrams each illustrating an example of a management table according to the exemplary embodiment.

FIG. 18 is a diagram illustrating an example of a license information table according to the exemplary embodiment.

DESCRIPTION OF THE EMBODIMENTS

Exemplary embodiments will be described in detail below with reference to the drawings. The components described in the following exemplary embodiments are merely illustrative, and the scope of the present disclosure is not limited to the following exemplary embodiments.

A first exemplary embodiment will be described in detail below with reference to the accompanying drawings. The following exemplary embodiment is not intended to limit the present disclosure. All combinations of features described in the present exemplary embodiment are not necessarily indispensable to the present disclosure.

According to the present exemplary embodiment, applications are defined as follows. A type of application that is provided by a network-connected web server is referred to as a web application (hereinafter, web app). An operation screen of a web app is displayed by using a web browser included in a multifunction peripheral. A type of application that is installed on a multifunction peripheral is referred to as a multifunction peripheral (MFP) application (device application; hereinafter, MFP app). An installed MFP app is stored in the MFP in the form of data and a program or programs.

Information Processing System

Figure 1:
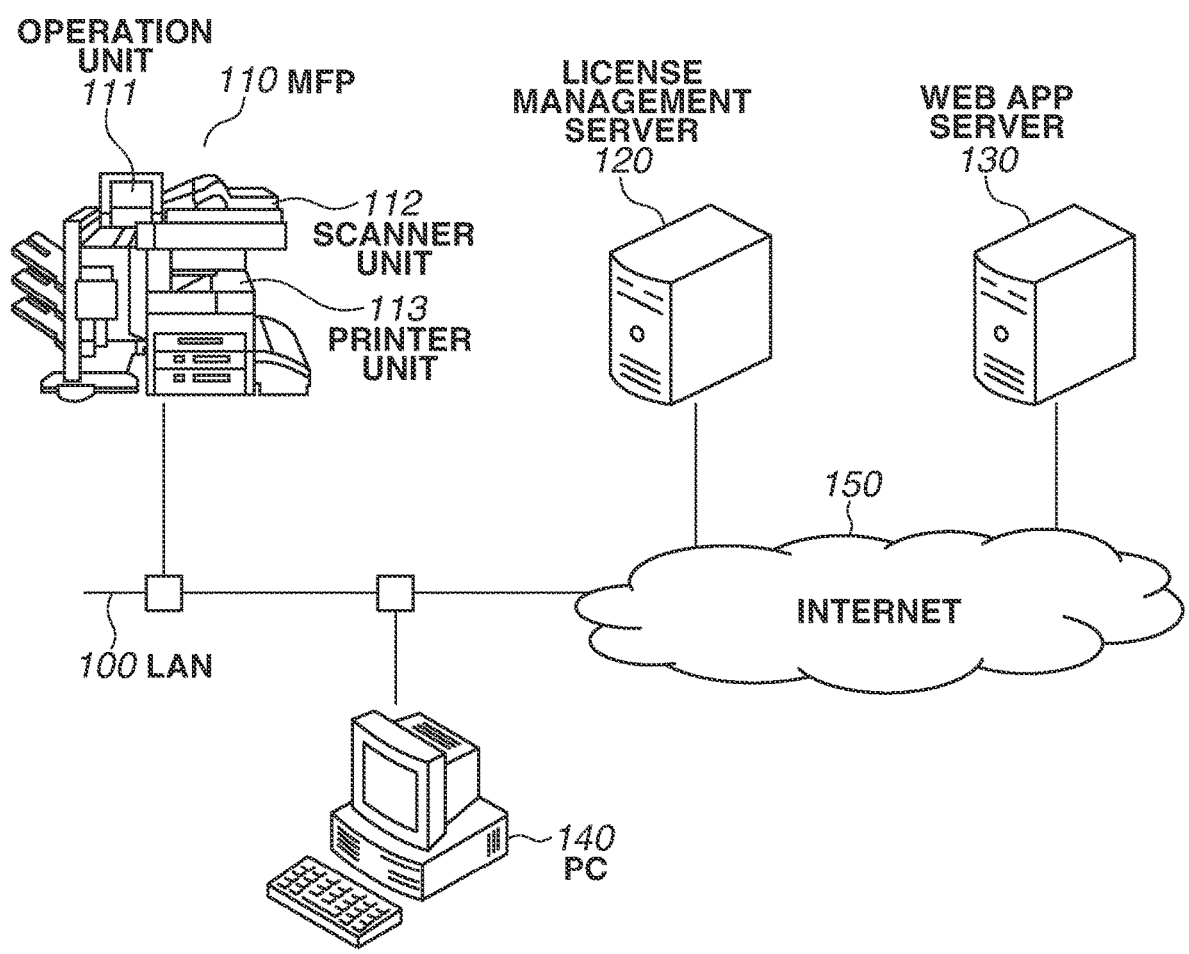
FIG. 1 is a diagram illustrating an overall configuration of an information processing system according to an exemplary embodiment.

FIG. 1 is a diagram illustrating an overall configuration of an information processing system according to the present exemplary embodiment. In the information processing system, an MFP 110 and a personal computer (PC) 140 are connected via a local area network (LAN) 100. The LAN 100 is connected to the Internet 150. A license management server 120 and a web app server (web server) 130 are also connected to the Internet 150.

The MFP 110 includes an operation unit 111, a scanner unit 112, and a printer unit 113. The MFP 110 according to the exemplary embodiment also functions as a client terminal for displaying and operating an operation screen of a web app by using a built-in (i.e., installed) web browser. Based on instructions from the web app, the MFP 110 can print an image obtained from the web app by using the printer unit 113 and transmit image data obtained by reading a document by using the scanner unit 112 to the web app. For that purpose, the MFP 110 includes a service provider for providing the functions that the device (MFP 110) has, such as a printer function and a scanner function, for a web app. The web app accessed from the MFP 110 can thus request the service provider of the MFP 110 to provide services using desired functions. The MFP 110 according to this exemplary embodiment is assigned an identifier called device identifier (ID). Each MFP can be uniquely identified and recognized by using its ID.

The license management server 120 is a server that manages licenses for MFP apps. The web app server 130 is a server that executes web apps. The PC 140 functions as a terminal apparatus for making various settings of the MFP 110. The above-described system configuration is just an example. The numbers of such devices are not limited to those in the present exemplary embodiment.

Hardware of Image Forming Apparatus (MFP)

Figure 2:
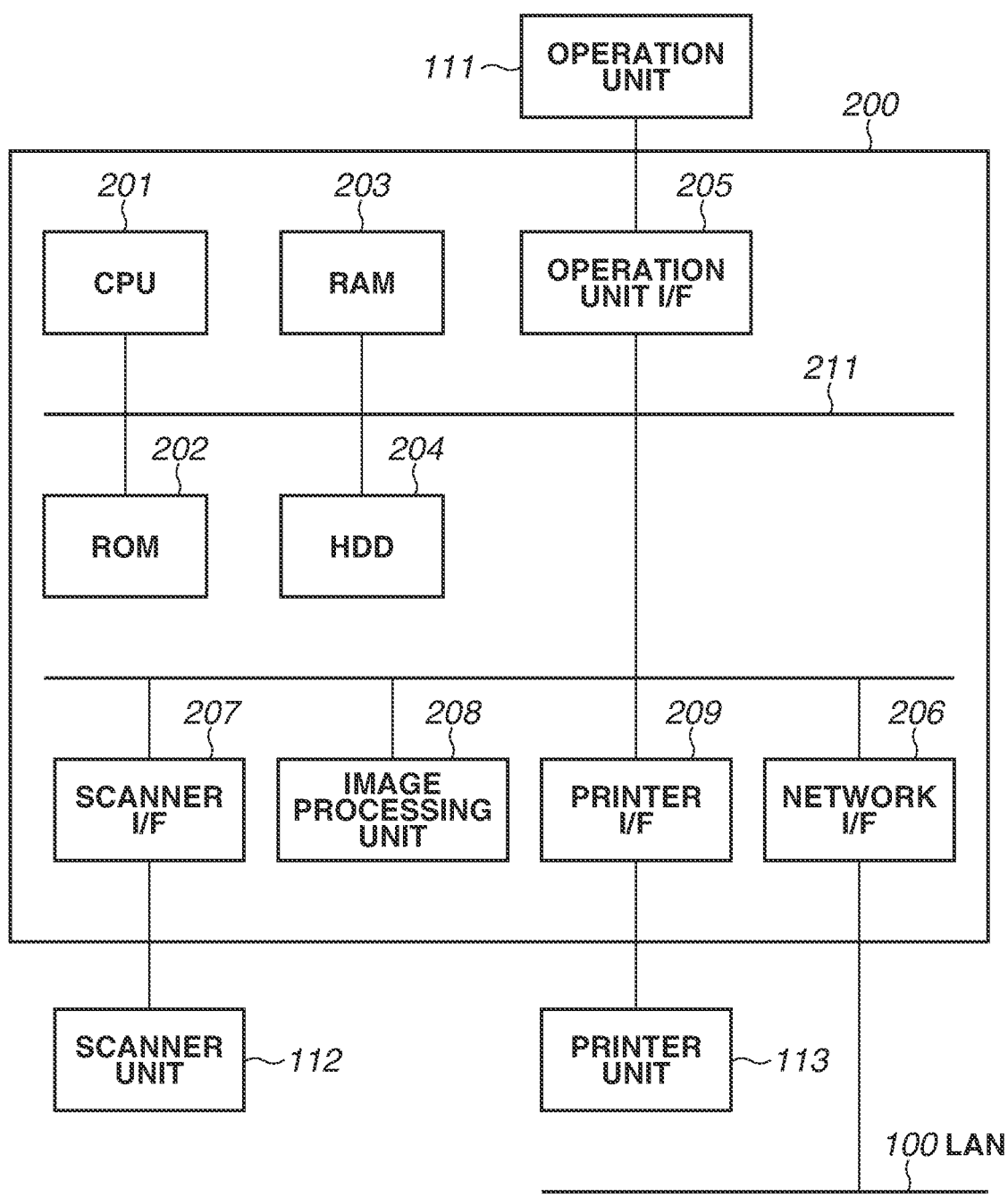
FIG. 2 is a block diagram illustrating a hardware configuration of a multifunction peripheral (MFP) according to the exemplary embodiment.

FIG. 2 is a block diagram illustrating a hardware configuration of the MFP 110 according to the exemplary embodiment. The operation unit 111 includes a display unit having a touch panel function and various hardware keys. The operation unit 111 displays information to the user based on data from a control unit 200, and inputs information to the control unit 200 based on the user's operations. The scanner unit 112 reads an image on a document and generates image data on the image to supply the image data to the control unit 200. The printer unit 113 prints an image on a sheet based on image data received from the control unit 200.

The control unit 200 is electrically connected to the operation unit 111, the scanner unit 112, and the printer unit 113, and is also connected to the LAN 100 via a network interface (I/F) 206. The control unit 200 can thus perform communication using a communication protocol such as the Transmission Control Protocol (TCP)/Internet Protocol (IP) via the LAN 100. The control unit 200 includes a central processing unit (CPU) 201, a read-only memory (ROM) 202, a random access memory (RAM) 203, a hard disk drive (HDD) 204, an operation unit I/F 205, the network I/F 206, a scanner I/F 207, an image processing unit 208, and a printer I/F 209, which are connected via a system bus 211. The CPU 201 executes a boot program in the ROM 202 to load an operating system (OS) and control programs stored in the HDD 224 into the RAM 203, and controls the MFP 110 in a centralized manner based on the programs. Such control includes executing programs for implementing flowcharts described below. The ROM 202 stores the boot program of the MFP 110 and various data. The RAM 203 provides a work memory for the CPU 201 to operate, and also provides an image memory for temporarily storing image data. The HDD 204 stores the OS, various programs, and image data. The operation unit I/F 205 is an I/F unit for connecting the system bus 211 and the operation unit 111. The network I/F 206 connects the LAN 100 and the system bus 211 with each other, and inputs and outputs information via the networks. The scanner I/F 207 controls the I/F between the scanner unit 112 and the control unit 200. The image processing unit 208 performs image processing, such as rotation, color conversion, and image compression/decompression processing, on image data input from the scanner unit 112 and image data to be output to the printer unit 113. The printer I/F 209 receives the image data processed by the image processing unit 208, and controls printing by the printer unit 113 based on attribute data accompanying the image data. According to the exemplary embodiment, the MFP includes a user interface (UI) display using the operation unit 111. However, an information processing apparatus such as a general-purpose computer can be employed instead of the MFP 110.

Hardware of License Management Server

Figure 3:
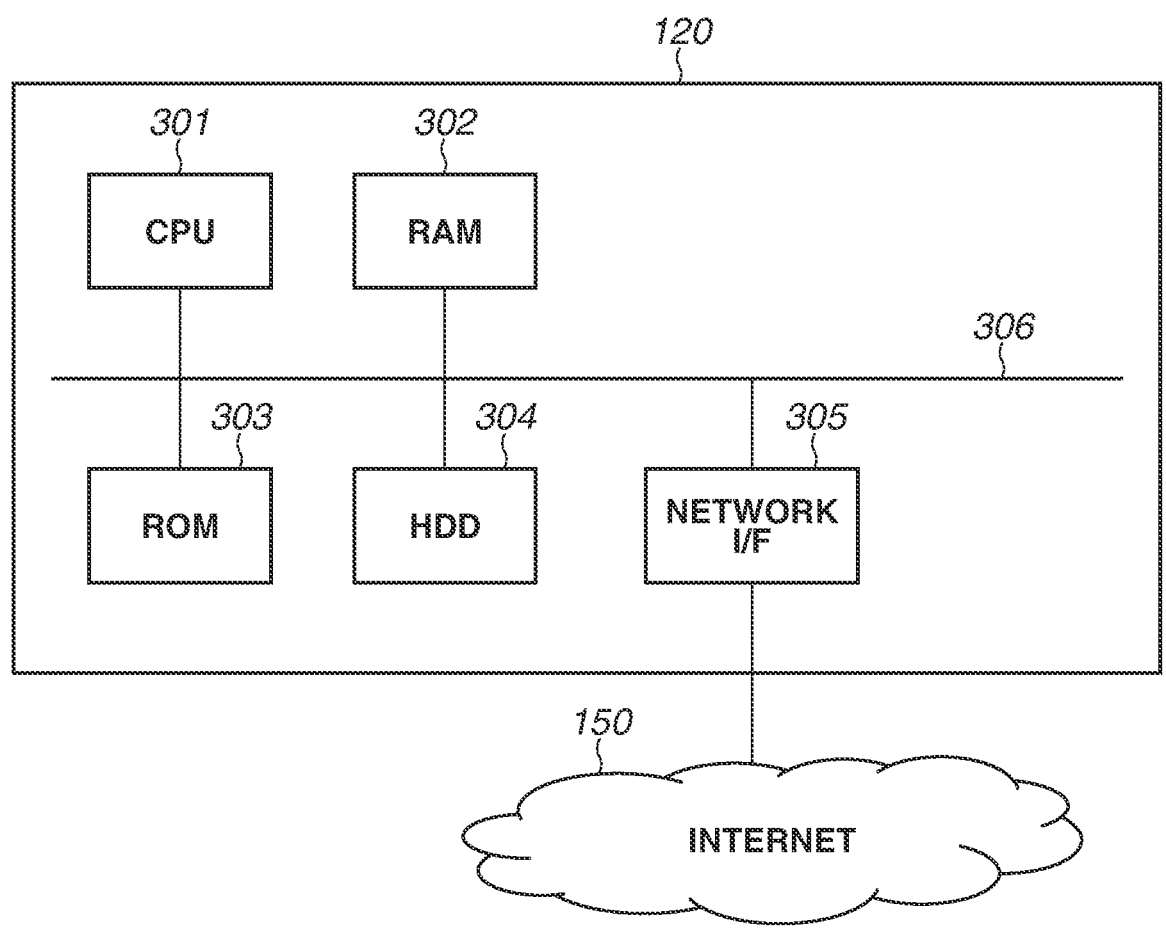
FIG. 3 is a block diagram illustrating a hardware configuration of a license management server according to the exemplary embodiment.

FIG. 3 is a block diagram illustrating a hardware configuration of the license management server 120 according to the exemplary embodiment.

The license management server 120 includes a CPU 301, a RAM 302, a ROM 303, an HDD 304, and a network I/F 305, which are connected to each other via a system bus 306 to communicate with each other. The ROM 303 stores a boot program. The CPU 301 reads the boot program and loads an OS and control programs installed on the HDD 304 into the RAM 302 upon power-on. The CPU 301 then executes the programs loaded in the RAM 302, whereby the functions of the license management server 120 are implemented. The CPU 301 communicates with other devices on the network connected via the network I/F 305. The web app server 130 and the PC 140 have a hardware configuration similar to that of the license management server 120 illustrated in FIG. 3. A description thereof will thus be omitted.

Software of License Management Server

Figure 4:
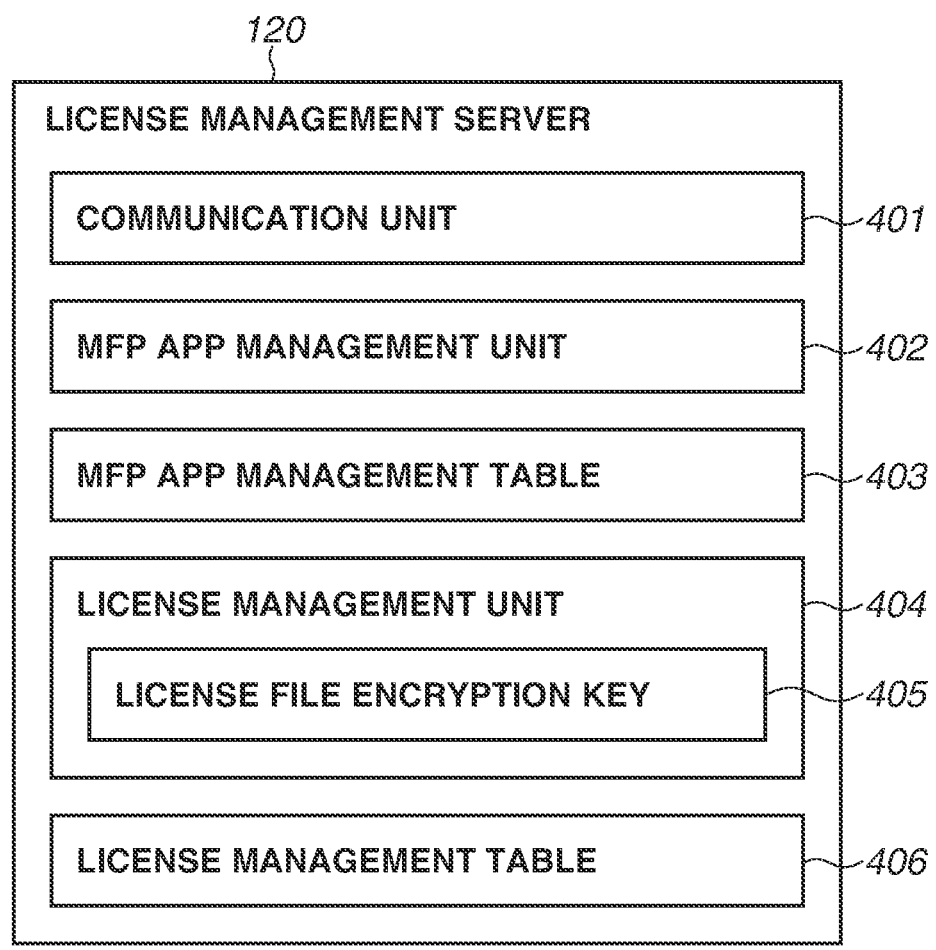
FIG. 4 is a block diagram illustrating a configuration of software modules of the license management server according to the exemplary embodiment.

FIG. 4 is a block diagram illustrating a configuration of software modules of the license management server 120 according to the exemplary embodiment. Programs for implementing such software modules are stored in the HDD 304 of the license management server 120. The CPU 301 loads the programs into the RAM 302 and executes the programs, whereby the functions of the software modules are implemented.

The license management server 120 according to the present exemplary embodiment performs three types of processing, including encryption of an MFP app, issuance of licenses for installing MFP apps on respective MFPs, and issuance of license access numbers for managing the individual licenses.

A communication unit 401 communicates with an external apparatus via a network, accepts processing requests, and assigns requests to an MFP app management unit 402 and a license management unit 404 based on the processing requests. The MFP app management unit 402 receives an unencrypted MFP app and encrypts the MFP app. The MFP app management unit 402 receives an MFP app from an application development vendor via a terminal (not illustrated) connected to the Internet 150. The MFP app management unit 402 then generates an ID (hereinafter, MFP app ID) for uniquely identifying the MFP app and a common encryption key for the MFP app, and registers the ID and the common encryption key in an MFP app management table 403. The MFP app ID is identification information for identifying each individual MFP app. The common encryption key for the MFP app is an encryption key for encrypting the MFP app. The MFP app management unit 402 then encrypts the MFP app by using the common encryption key, and transmits the encrypted MFP app and the MFP app ID to the request source. The MFP app management table 403 is a database that stores the MFP app ID and the common encryption key for the MFP app, generated by the MFP app management unit 402, in association with each other.

FIG. 5A is a diagram illustrating an example of the MFP app management table 403 according to the exemplary embodiment. A column 501 illustrates MFP app IDs. A column 502 illustrates common encryption keys for the MFP apps.

The license management unit 404 issues licenses for installing MFP apps on each of the MFPs, and manages license access numbers for issuing the licenses. If the license management unit 404 receives an issuance request for a license access number corresponding to an MFP app to be sold from an application sales vendor, the license management unit 404 issues a license access number corresponding to the MFP app. The license management unit 404 then registers the license access number in a license management table 406. The license access number is a number for uniquely managing a single license for the MFP app. The vendor of the application sells the encrypted MFP app described above and the license access number together. If the license management unit 404 receives a license access number and a device ID from the purchaser of an MFP app, the license management unit 404 issues a license to the purchaser (user). The issuance of the license includes processing for referring to the MFP app management table 403 and the license management table 406 and generating a license file corresponding to the license access number.

The license management unit 404 obtains the MFP app ID corresponding to the received license access number, and obtains the common encryption key for the MFP app linked with the MFP app ID. The license management unit 404 then issues a license ID, records the device ID and the license ID in the license management table 406, and generates a license file containing such pieces of information. The license management unit 404 encrypts the generated license file with a license file encryption key 405 stored inside, and transmits the encrypted license file to the request source. The license file encryption key 405 is a public key in public-key cryptography. A corresponding secret key is included in software of the MFP 110 described below. The license management table 406 is a database that stores information about licenses.

FIG. 5B is a diagram schematically illustrating an example of the license management table 406 according to the exemplary embodiment. A column 511 includes MFP app IDs, a column 512 includes license access numbers, and a column 513 includes the expiration dates of licenses in terms of the number of days. The number of days indicates how many days the MFP app is valid for from the date and time of installation on the MFP. A column 514 includes devices IDs (IDs of the MFPs on which the MFP apps are installed), and a column 515 includes license IDs. A row 516 includes an example of an MFP app for which a license access number is issued and a license is not issued. Here, the device ID and the license ID are null. A row 517 includes an example of an MFP app for which a license is issued. A device ID (DEV001) and a license ID (LIC001) are registered in the row 517. A row 518 also includes an example of an MFP app for which a license is issued, with an expiration date of 60 days. A device ID (DEV002), and a license ID (LIC002) are registered in the row 518.

In such a manner, the IDs of the MFP apps and the device IDs of MFPs 110 are registered in the license management table 406 in association with each other. The license management table 406 can be consulted to find out which MFP app is licensed to which MFP.

FIG. 6A is a diagram illustrating an example of a license file issued by the license management server 120 according to the exemplary embodiment. FIG. 6A illustrates an example of the license file corresponding to the row 518 of the license management table 406 in FIG. 5B. Here, the license ID (LIC002), MFP app ID (APP712), device ID (DEV002), and expiration date (60 days) are obtained from the license management table 406 of FIG. 5B. The common encryption key (WasiIDcQR6dYj . . . ) for the application (APP712) is obtained from the MFP app management table 403 of FIG. 5A. The license file is thus generated based on the information obtained from the MFP app management table 403 and the license management table 406 by the license management unit 404. In such a manner, the purchaser of the MFP app can obtain the encrypted license file based on the license access number of the purchased MFP app.

Software of MFP

Figure 7:
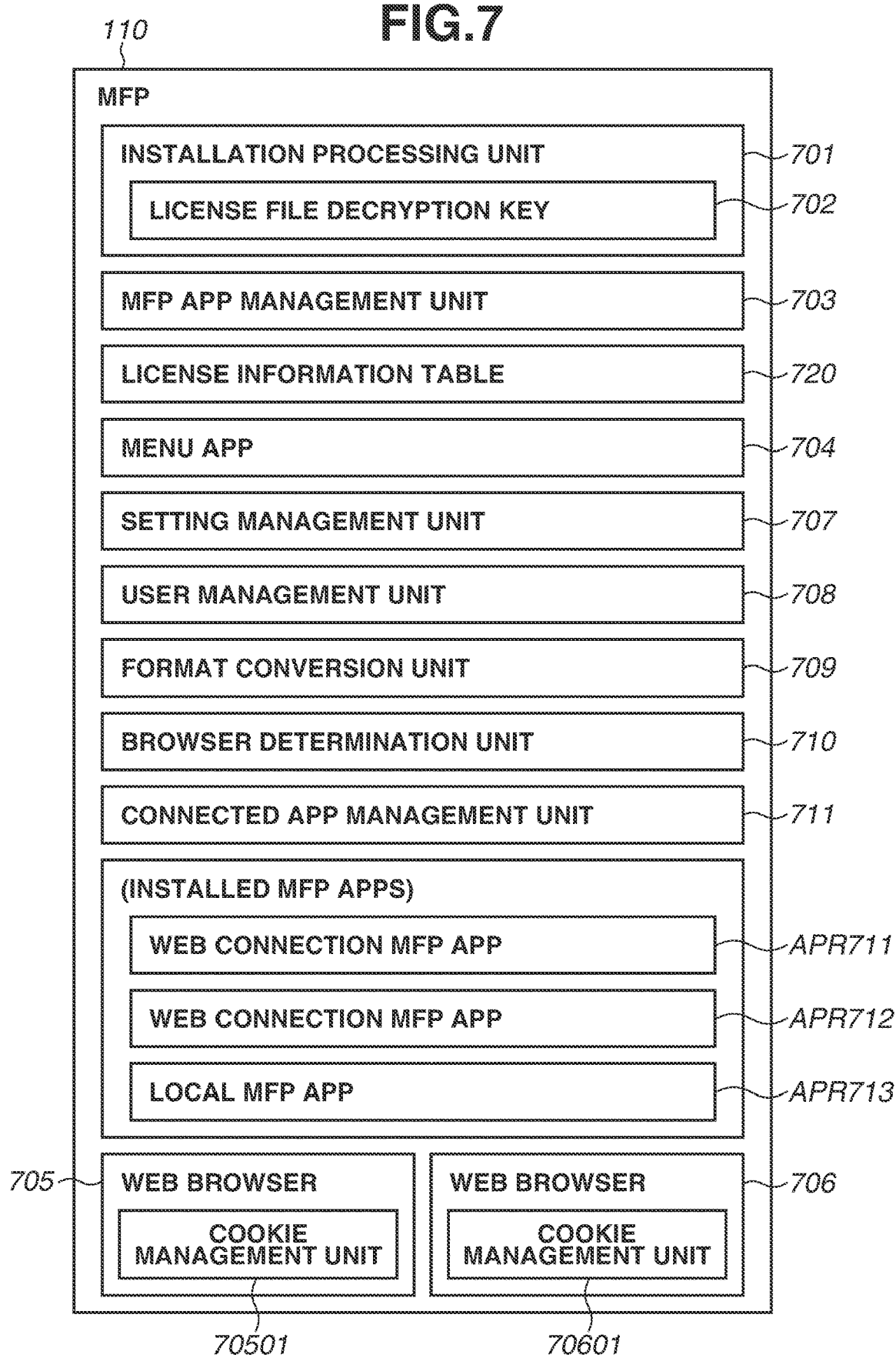
FIG. 7 is a diagram illustrating a configuration of applications and software modules of the MFP according to the exemplary embodiment.

FIG. 7 is a diagram illustrating a configuration of software modules of the MFP 110 according to the exemplary embodiment. The software modules are stored in the HDD 204 of the MFP 110, and loaded into the RAM 203 at execution time and executed by the CPU 201. If an MFP app is installed on an application platform, the MFP app can be said to be executed by the application platform. Even in such a case, the MFP app is executed by the CPU 201 since the application platform is a software module.

An installation processing unit 701 controls installation of an MFP app. The installation processing unit 701 is connected to the PC 140 via the network I/F 206, and performs the installation of an MFP app based on an instruction from the PC 140. The installation processing unit 701 includes a license file decryption key 702 for decrypting an encrypted license file. The license file decryption key 702 corresponds to the license file encryption key 405 described above. An MFP app management unit 703 manages MFP apps installed on the MFP 110. A license information table 720 is a database storing information about the installed MFP apps and license files.

FIG. 18 is a diagram schematically illustrating an example of the license information table 720 according to the exemplary embodiment. The license information table 720 includes an MFP app ID 1801, a license expiration date

1802, a license ID 1803, and a license ID history 1804. The license ID history 1804 is a history of license IDs installed in the past. The history is stored to prevent reuse of licenses.

A row 1811 illustrates that a license having an indefinite expiration date is issued for an MFP app having an MFP app ID "APP711" with a license ID "LIC010". A row 1812 illustrates that a license having an expiration date of 2016 Dec. 10 is issued for an MFP app having an MFP app ID "APP712" with a license ID "LIC002". The row 1812 also illustrates that a license with a license ID "LIC003" has been installed in the past. A row 1813 illustrates that a license having an indefinite expiration date is issued for an MFP app having an MFP app ID "APP713" with a license ID "LIC011".

A menu app 704 displays a graphical user interface (GUI) enabling the user to select an MFP app installed on the MFP 110 and for executing the selected MFP app. A web browser 705 and a web browser 706 communicate with the web app server 130. The web browsers 705 and 706 transmit a request to the web app server 130 by using the Hypertext Transfer Protocol (HTTP) protocol. The web browsers 705 and 706 render Hypertext Markup Language (HTML) data (screen information) returned in response to the request and display the resultant on the operation unit 111, and/or interpret and execute JavaScript® returned. The web browsers 705 and 706 are different from each other. For example, the web browsers 705 and 706 include different browser engines (different HTML rendering engines).

Installation of an MFP app by the purchaser of the MFP app will now be described. The user transmits the encrypted application (application program file) and the encrypted license file to the installation processing unit 701 by using the PC 140. The installation processing unit 701 performs MFP app installation processing by using the received files. The installation processing unit 701 initially decrypts the license file by using the license file decryption key 702. The installation processing unit 701 then decrypts the encrypted MFP app by using the common encryption key for the MFP app, included in the decrypted license file. The MFP app thus decrypted is passed to the MFP app management unit 703 and stored into the HDD 204. Here, the installation processing unit 701 compares the device ID described in the decrypted license file with the device ID preset in the MFP 110, and determines whether the license file is a proper one. The installation processing unit 701 calculates the date and time at which the MFP app becomes invalid from the expiration date described in the license file and the current date and time. The MFP app management unit 703 manages the calculated date and time as expiration date.

In FIG. 7, three MFP apps, APP711, APP712, and APP713, are installed as an example of the exemplary embodiment. According to the present exemplary embodiment, two types of MFP apps, a web connection MFP app and a local MFP app, are defined as MFP apps. Web connection MFP apps and local MFP apps are collectively referred to simply as MFP apps. The MFP apps APP711 and APP712 are web connection MFP apps. The MFP app APP713 is a local MFP app.

A web connection MFP app is an app for performing a function provided by a web app arranged on a web server from the MFP 110. The web connection MFP app connects to the web app by using the web browser 705 or 706, and performs the function provided by the web app from the MFP 110. Details of the web connection MFP apps APP711 and APP712 will be described below with reference to FIG. 8.

A local MFP app is an app for providing functions using the scanner unit 112, the printer unit 113, and/or the image processing unit 208 of the MFP 110 for the MFP 110 in the form of software modules. The local MFP app calls its own software modules to perform the functions it provides on the MFP 110. Details of the local MFP app APP713 will be described below with reference to FIGS. 16A and 16B. The types and number of MFP apps installed on an MFP vary from one MFP to another.

An example of an MFP app is a program written in JAVA®. Such an MFP app is installed, for example, on a platform based on a JAVA® execution environment provided on the MFP 110.

A setting management unit 707 manages information for identifying a browser to be used as a default browser from among a plurality of browsers installed. The setting management unit 707 stores a default browser table for managing setting information about the default browser. FIG. 9B is a diagram illustrating an example of the default browser table, which illustrates that the web browser 705 is set as the default browser. The default browser table is just an example, and the information from which the default browser can be identified can be stored in any form.

A user management unit 708 manages users and manages information for identifying a logged-in user. FIG. 9C is a diagram illustrating an example of a user management table stored by the user management unit 708. UserA is the logged-in user. The user management table is just an example, and the information from which the logged-in user can be identified can be stored in any form.

A format conversion unit 709 accepts a request for format conversion if type information and a cookie or cookies containing the type information are specified as arguments. The format conversion unit 709 performs conversion to match the type of cookie information to the type information specified by the arguments, and returns cookie information resulting from the conversion. According to the present exemplary embodiment, the format conversion unit 709 retains a conversion table and performs format conversion based on the conversion table. Specifically, in the case of converting a cookie of type 1 into a cookie of type 2, the format conversion unit 709 converts the cookie of type 1 into the cookie of type 2 based on the cookie of type 1 and a conversion table for conversion from type 1 to type 2.

A browser determination unit 710 identifies a web browser that is set as a default browser by using the default browser table stored by the setting management unit 707. A connection app management unit 711 manages information for identifying a called app among the plurality of web connection MFP apps. FIG. 9A illustrates an example of a table managed by the connection app management unit 711. The web connection MFP app APP712 is the called app.

The web browsers 705 and 706 are different web browsers. A cookie management unit 70501 stores cookies (keys and values) to be used by the web browser 705. A cookie management unit 70601 stores cookies (keys and values) to be used by the web browser 706. Examples of cookies (cookie information) include an authentication ID (user ID or user's identification information) and a password that are used for logging in, and a document name to be specified in a document-storing service.

Web Connection MFP Apps

FIG. 8 is a diagram illustrating a configuration of software modules of the web connection MFP apps APP711 and APP712 according to the exemplary embodiment. The web connection MFP apps APP711 and APP712 retain setting information needed for each web app in a manifest file 801 and an electronic signature key 815. In other words, one web connection MFP app is needed for one web app. A web connection MFP app corresponding to a web app to be used is installed on the MFP 110. If a plurality of web apps is used, a plurality of web connection MFP apps is installed on the MFP 110. In such a case, the plurality of web connection MFP apps shares the web browser 705 or 706. A web connection MFP app includes a manifest file 801 not to be encrypted when the MFP app management unit 402 encrypts the MFP app, and an application program file main body section to be encrypted. These software modules illustrated in FIG. 8 are stored in the HDD 204 of the MFP 110, and loaded into the RAM 203 at execution and executed by the CPU 201.

The manifest file 801 is a file describing basic information about the MFP app and information for connecting to the web app. FIG. 6B illustrates an example of the manifest file 801 according to the exemplary embodiment. The manifest file 801 defines an MFP app ID 901, an application name 902, a web application Uniform Resource Locator (URL) 903, a context root URL 904, and device information list 905.

The MFP app ID 901 is the same ID as that managed in the MFP app management table 403. The application name 902 indicates the name of the MFP app. Such basic information can be referred to without decryption even if the application program file main body section is encrypted. The web application URL 903, the context root URL 904, and the device information list 905 are information unique to the web connection MFP app.

The web application URL 903 indicates the URL of the top page of the web app. In other words, the web application URL 903 represents access destination information (URL information) for receiving service from the web app. The context root URL 904 indicates the topmost path of the web app. The device information list 905 indicates a list of device information to be notified in calling the top page of the web app. The device information refers to information about the MFP 110. Examples include information for identifying each individual MFP 110 or the model of the MFP 110, an activated option function of the MFP 110, a logged-in user name, and a software version. If the device information does not need to be obtained, the device information list 905 can be left undefined in the manifest file 801. The information recorded in the manifest file 801 is information uniquely associated with the corresponding MFP app.

In the application program file main body section, a menu app cooperation unit 811 is a module for cooperating with the menu app 704. The menu app cooperation unit 811 registers a GUI button for calling the web connection MFP app in the menu app 704. A web browser cooperation unit 812 is a module for operating the web browser 705 or 706. Specifically, the web browser cooperation unit 812 passes the URL of the web app and cookies to the web browser 705 or 706, and displays the web browser 705 or 706 on the foreground of the operation unit 111. A device information acquisition unit 813 obtains the device information specified by the device information list 905. A signature processing unit 814 generates an electronic signature that is added when connection to the web app is established. The electronic signature is generated by using an electronic signature key 815. The web app uses the electronic signature to check that the web app is called by the web connection MFP app. The web app can omit the check. In such a case, the electronic signature is not needed, and the web connection MFP app is configured to not include the electronic signature key 815.

Web connection MFP apps differ from each other only in the description of the manifest file 801 and the electronic signature key 815. The other software modules are common between all the web connection MFP apps. In other words, a web connection MFP app can be generated by diverting the software modules and defining only the information about a web app. For example, a web connection MFP app can be easily generated by providing a tool that outputs a web connection MFP app when information about a web app is input.

The generated web connection MFP app is transmitted to the license management server 120, whereby the software modules and files other than the manifest file 801 are encrypted into one file. By using such an application encryption function, application development vendors can prevent the contents of applications from being analyzed by the third party. In addition, the electronic signature key 815 included inside can be prevented from being extracted.

A cookie management unit 816 manages and stores cookies about users, URLs, keys, and values. FIG. 9D is a diagram illustrating examples of cookies stored by the cookie management unit 816 of the web connection MFP app APP711.

Software of Web App Server

Figure 10:
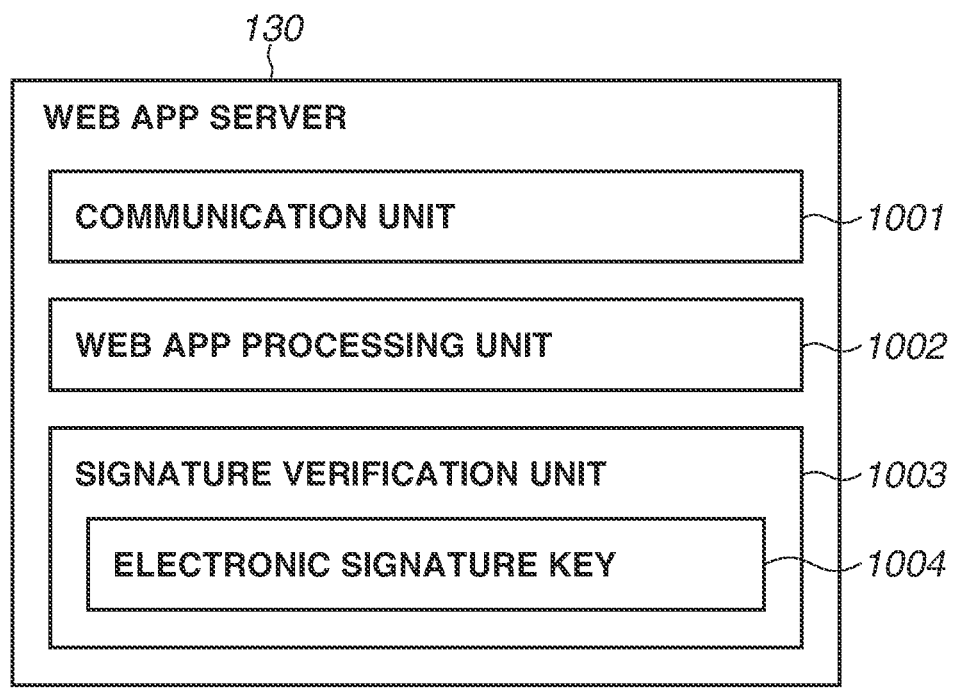
FIG. 10 is a diagram illustrating a configuration of software modules of a web application server according to the exemplary embodiment.

FIG. 10 is a diagram illustrating a configuration of software modules of the web app server 130 according to the present exemplary embodiment. The software modules are stored in the HDD 304 of the web app server 130, and loaded into the RAM 302 at execution and executed by the CPU 301, whereby the functions of the software modules are implemented.

A communication unit 1001 communicates with an external apparatus via a network, and accepts and responds to requests. A web app processing unit 1002 responds to a request made from the MFP 110 by using the HTTP protocol. The web app processing unit 1002 generates HTML contents to be displayed by the web browser 705 or 706 of the MFP 110, and generates contents for operating the MFP 110. A signature verification unit 1003 includes an electronic signature key 1004 corresponding to the electronic signature key 815 included in the web connection MFP app illustrated in FIG. 8. The signature verification unit 1003 verifies signature information electronically signed with the electronic signature key 815. By verifying the electronic signature, the signature verification unit 1003 can determine whether the request is one from the MFP 110 on which the web connection MFP app is installed. For example, according to the present exemplary embodiment, a hash-based message authentication code (HMAC) used as the electronic signature technique. In other words, the electronic signature key 815 and the electronic signature key 1004 are the same secret key (common key). Other techniques can be used for the electronic signature. For example, if a digital signature is used as the electronic signature technique, the electronic signature key 815 of the web connection MFP app serves as a secret key and the electronic signature key 1004 of the web app server 130 serves as a public key corresponding to the secret key since the digital signature uses public key cryptography.

MFP App Installation Processing

Figure 11:
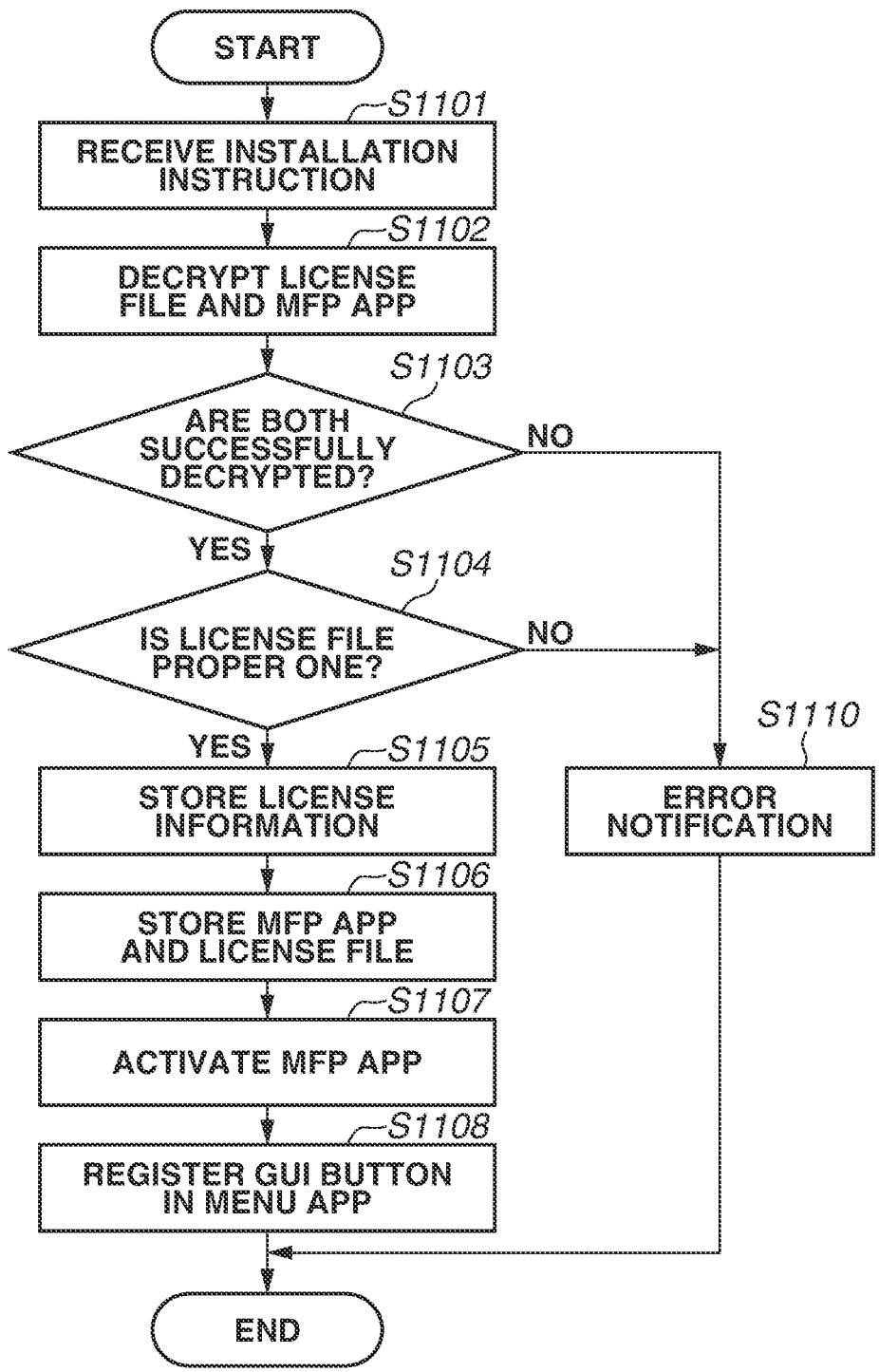
FIG. 11 is a flowchart illustrating an example of processing by the MFP according to the exemplary embodiment.

FIG. 11 is a flowchart for describing MFP app installation processing performed by the MFP 110. The steps in the flowchart of FIG. 11 are performed by the CPU 201 reading a program stored in the HDD 204 of the MFP 110 into the RAM 203 and analyzing and executing the program. For preparation, the purchaser of an MFP app receives the encrypted MFP app and a license access number from the vendor of the MFP app, receives an encrypted license file from the license management server 120, and stores the encrypted MFP app, the license access number, and the encrypted license file in the PC 140 as described above.

In step S1101, the installation processing unit 701 receives the encrypted MFP app and the encrypted license file as an installation instruction from the PC 140 operated by the purchaser of the MFP app. In step S1102, the installation processing unit 701 decrypts the received license file by using the license file decryption key 702. The installation processing unit 701 then decrypts the encrypted MFP app, which is included in the decrypted license file, by using the common encryption key for the MFP app. If the MFP app is a web connection MFP app, the software modules of the menu app cooperation unit 811, the web browser cooperation unit 812, the device information acquisition unit 813, and the signature processing unit 814, and the file of the electronic signature key 815 are decrypted in this processing procedure.

In step S1103, the installation processing unit 701 checks whether both the license file and the MFP app are successfully decrypted. If both are successfully decrypted (YES in step S1103), the processing proceeds to step S1104. If either one or both fails/fail to be decrypted (NO in step S1103), the processing proceeds to step S1110. In step S1110, the installation processing unit 701 issues an error notification. The processing then ends.

In step S1104, the installation processing unit 701 compares the device ID described in the decrypted license file with the device ID preset in the MFP 110, and determines whether the license file is a proper one corresponding to the MFP 110. If the installation processing unit 701 determines that the license file is a proper one (YES in step S1104), the processing proceeds to step S1105. If the installation processing unit 701 determines that the license file is not a proper one (NO in step S1105), the processing proceeds to step S1110. In step S1110, the installation processing unit 701 issues an error notification. The processing then ends.

In step S1105, the installation processing unit 701 stores license information into the license information table 720. The license information includes the MFP app ID, the license ID, and the expiration date of the license. In this processing procedure, the installation processing unit 701 calculates the date and time at which the MFP app becomes invalid from the expiration date recorded in the license file and the current date and time, and registers the calculation result as the expiration date of the license. If the expiration date recorded in the license file is indefinite, the installation processing unit 701 simply registers the expiration date as being indefinite.

In step S1106, the installation processing unit 701 stores the decrypted MFP app and license file into the HDD 204. In step S1107, the installation processing unit 701 reads the MFP app stored in the HDD 204 into the RAM 203 and activates the MFP app. In step S1108, the activated MFP app registers a GUI button for calling the MFP app in the menu app 704. If the activated MFP app is a web connection MFP app, the menu app cooperation unit 811 performs the processing of step S1108. If the activated MFP app is a local MFP app, the menu app cooperation unit 1611 performs the processing of step S1108. If the activated MFP app is a local MFP app that has no screen to be displayed on the operation unit 111 and does not need to register a GUI button in the menu app 704, the processing of step S1108 is skipped.

Figure 12A:
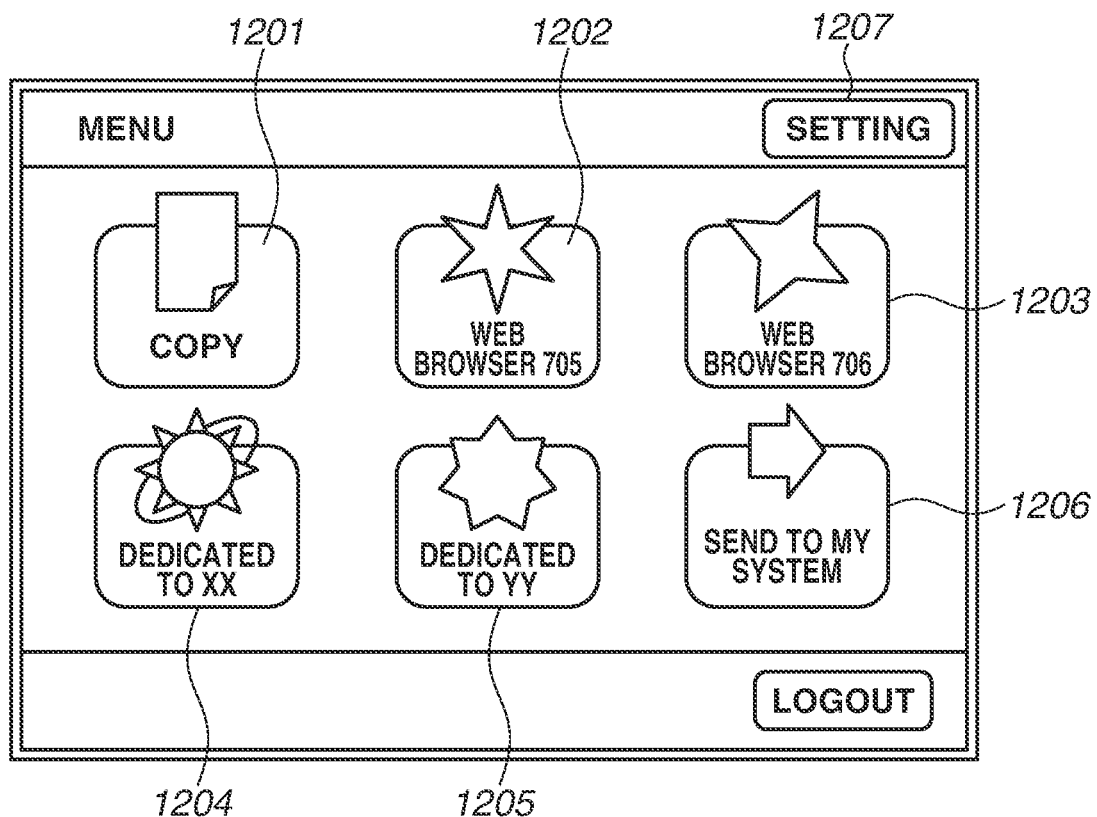
FIGS. 12A and 12B are diagrams each illustrating an example of a graphical user interface (GUI) displayed on an operation unit of the MFP according to the exemplary embodiment.

FIG. 12A is a diagram illustrating an example of a GUI displayed on the operation unit 111 when the menu app 704 of the MFP 110 is called in a state where the MFP apps APP711 and APP712 are installed on the MFP 110 according to the exemplary embodiment. A GUI button 1201 is a GUI button for calling an application provided on the MFP 110 from the beginning.

A GUI button 1202 is a GUI button for calling the web browser 705. A GUI button 1203 is a GUI button for calling the web browser 706. The web browsers 705 and 706 are respective different browsers. For example, the web browsers 705 and 706 include rendering engines different from each other. If the GUI button 1202 or 1203 is pressed, a browser screen of the corresponding web browser is displayed. To connect to a web app, the user inputs or specifies a URL address on the browser screen.

A GUI button 1204 is a GUI button for calling the web connection MFP app APP711. A GUI button 1205 is a GUI button for calling the web connection MFP app APP712. According to the present exemplary embodiment, "DEDICATED TO XX" on the GUI button 1204 and "DEDICATED TO YY" on the GUI button 1205 are the names of the applications.

A GUI button 1206 is a GUI button for calling the local MFP app APP713. As illustrated in FIG. 12A, the menu app 704 displays the GUI buttons irrespective of the types of MFP apps.

The GUI buttons can be selected only during periods when their licenses are valid. Suppose, for example, that the web connection MFP app APP712 is installed under a license valid for 60 days. In such a case, the GUI button 1205 is enabled until the 60th day from the installation, and disabled on and after the 61st day. If the GUI button 1206 is disabled, the corresponding MFP app APP712 becomes unable to be called and thus unable to connect to the web app.

A GUI button 1207 provides a function for calling the settings of the MFP 110 according to the exemplary embodiment. Since a plurality of browsers is installed in the present exemplary embodiment, a browser to be used as a default browser is set from among the plurality of browsers. If a web browser is called without specifying a browser, the web browser set as the default browser is used.

Figure 12B:
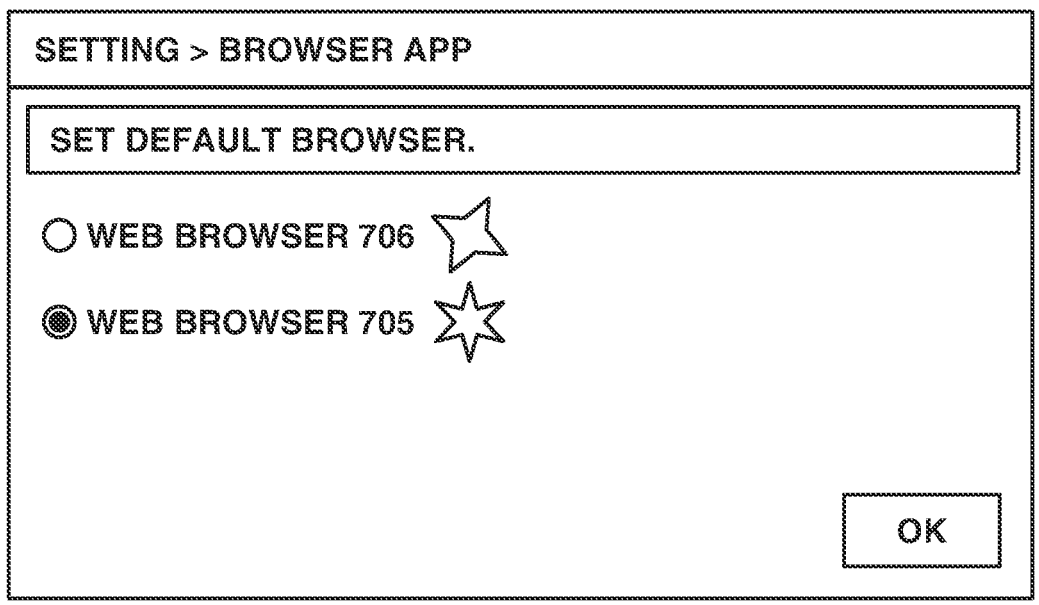

FIG. 12B is a diagram illustrating a screen for setting the browser that is to be used as a default browser. In FIG. 12B, the web browser 705 is illustrated to be set as the default browser. The information that the web browser 705 is set as the default browser is stored in the default browser table of FIG. 9B managed by the setting management unit 707.

Processing by Menu App

Figure 19:
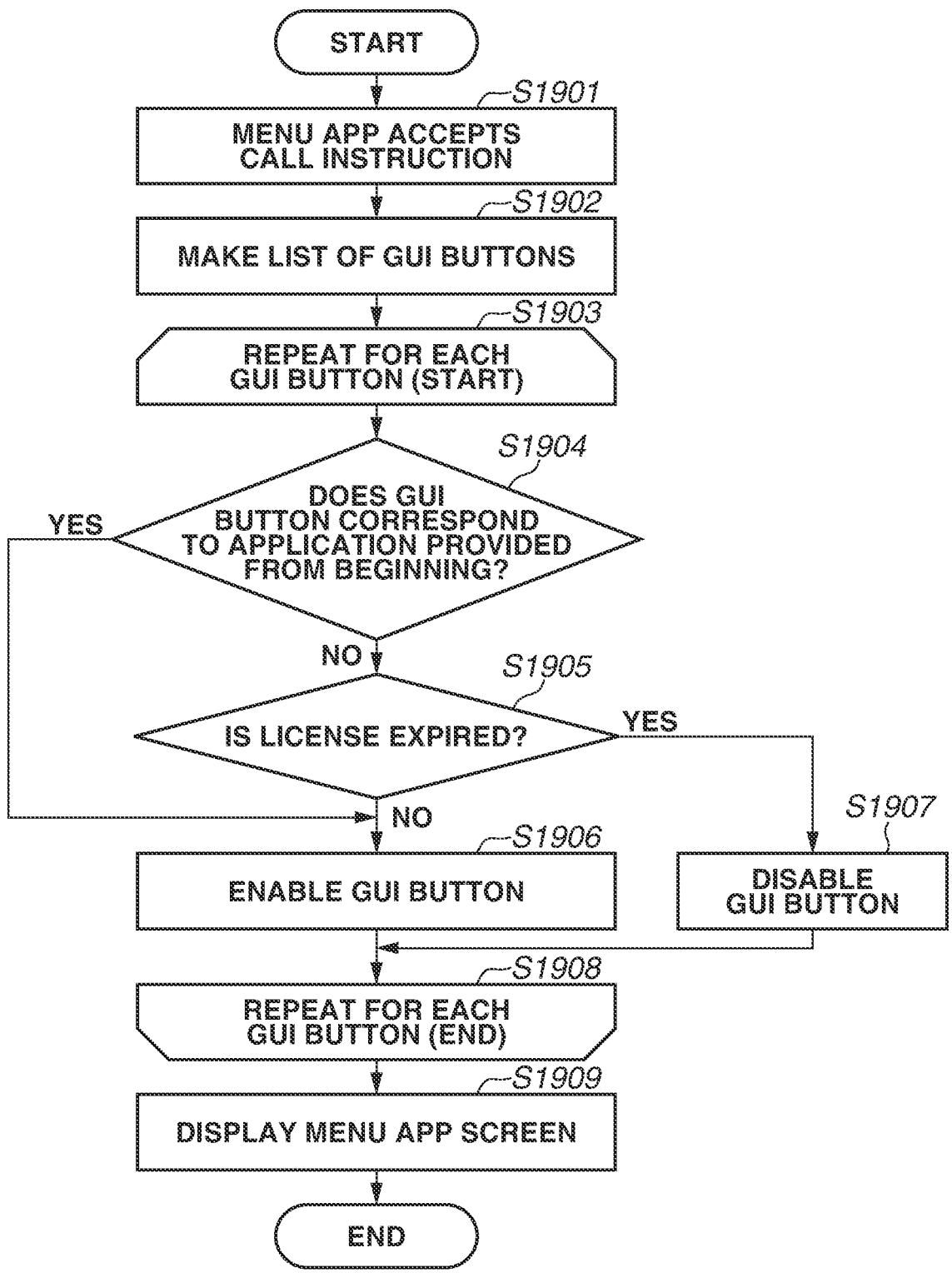
FIG. 19 is a flowchart illustrating an example of processing by the MFP according to the exemplary embodiment.

FIG. 19 is a flowchart for describing processing that is performed by the menu app 704 installed on the MFP 110 in response to receipt of a call instruction. The menu app 704 checks the licenses for the MFP apps corresponding to the GUI buttons, and makes the GUI buttons of MFP apps with valid licenses selectable. The steps in the flowchart of FIG. 19 are implemented by the CPU 201 reading a program stored in the HDD 204 of the MFP 110 into the RAM 203 and analyzing and executing the program.

In step S1901, the menu app 704 accepts a call instruction. In step S1902, the menu app 704 makes a list of GUI buttons registered in itself. The call instruction is issued, for example, upon power-on of the MFP 110 or in response to a predetermined operation by the user. To verify the validity of the GUI buttons listed, the menu app 704 repeats the processing of steps S1903 to S1908 for each of the GUI buttons.

In step S1904, the menu app 704 determines whether a GUI button corresponds to an application provided from the beginning. If the GUI button corresponds to an application provided from the beginning (YES in step S1904), the processing proceeds to step S1906. If the GUI button corresponds to an MFP app installed afterward (NO in step S1904), the processing proceeds to step S1905. In step S1905, the menu app 704 determines the expiration date of the license for the MFP app corresponding to the GUI button by using the license information table 720. In other words, the menu app 704 determines the validity of the license. If the license is not expired (NO in step S1905), the processing proceeds to step S1906. If the license is expired (YES in step S1905), the processing proceeds to step S1907. In step S1906, the menu app 704 enables the GUI button. In step S1907, the menu app 704 disables the GUI button. The GUI button is disabled, for example, by hiding the GUI button itself or by displaying the GUI button in a state incapable of pressing. Alternatively, a message indicating that the license is expired can be displayed after the GUI button is pressed. If the menu app 704 has processed all the GUI buttons, the processing proceeds to step S1909. In step S1909, the menu app 704 displays a menu app screen (menu screen) illustrated in FIG. 12A on the operation unit 111. The processing then ends. To return to the menu screen after a GUI button displayed by the menu app 704 is operated and the MFP app is executed, the menu app 704 is called to perform the processing of FIG. 19. The expiration dates of the licenses for non-default MFP apps are thus checked each time the menu screen is displayed.

Call and Execution of Web App

Figure 13:
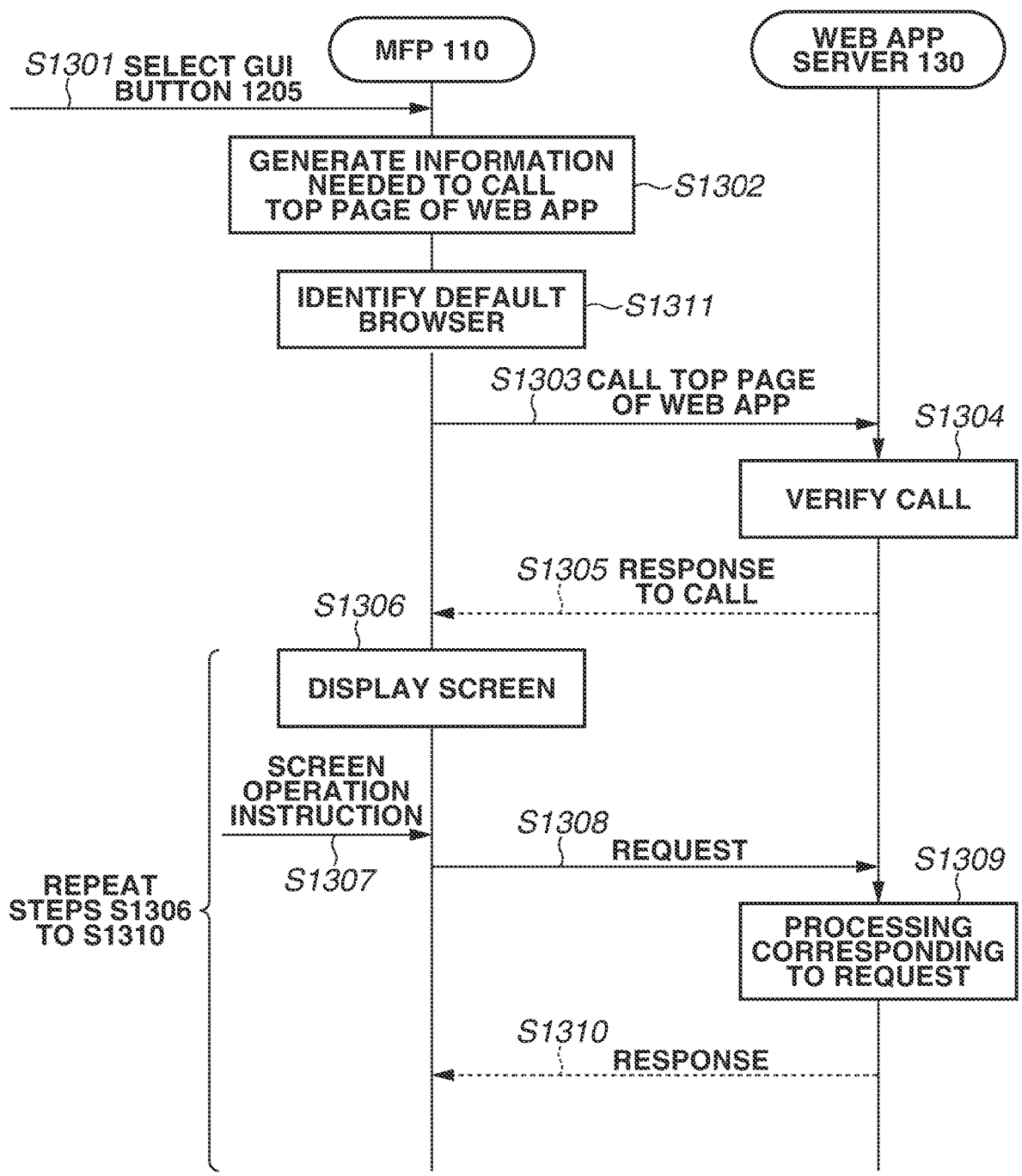
FIG. 13 is a sequence diagram illustrating an example of processing in the information processing system according to the exemplary embodiment.

FIG. 13 is a sequence diagram illustrating a flow of a series of processes in a case where a web app is used from the MFP 110. A description will be provided of a case where the GUI button 1205 displayed by the menu app 704 is selected by the user.

In step S1301, in a case where the menu app 704 of the MFP 110 accepts the pressing of the GUI button 1205 by the user, the menu app 704 calls the MFP app APP712 corresponding to the GUI button 1205. In step S1302, the called MFP app APP712 generates information needed to call the top page of the web app based on the information defined in the manifest file 801 of the MFP app APP712. The information needed to call the top page of the web app includes device information defined in the device information list 905 and an electronic signature generated by using the electronic signature key 815. In step S1311, the browser determination unit 710 identifies the browser to be used as a default browser. According to the present exemplary embodiment, the web browser 705 is identified as the default browser. In step S1303, the MFP app APP712 calls the top page of the web app based on the information generated in step S1302 by using the identified web browser.

In step S1304, in response to receipt of the call, the web app server 130 verifies the call. To verify the call, for example, the web app server 130 checks the authenticity of the electronic signature by checking that the call is performed by the MFP 110 on which the web connection MFP app APP712 is installed. In step S1305, based on the verification result, the web app server 130 sends a response to the call to the MFP 110 (web browser). For example, the response includes information indicating OK (verification succeeded) or NG (verification failed) as the verification result. If the verification result is OK, the web app server 130 responds with HTML contents for configuring a screen needed for the next operation.

In step S1306, the web browser 705 renders the received HTML contents, and displays the screen on the operation unit 111. In step S1307, the web browser 705 receives a screen operation instruction from the user. In step S1308, the web browser 705 transmits a request corresponding to the screen operation instruction to the web app server 130 by using the HTTP protocol.

In step S1309, the web app server 130 receiving the request performs processing corresponding to the request. In step S1310, the web app server 130 responds to the MFP 110 (web browser 705) with HTML contents for configuring the next screen based on the processing result. Steps S1306 to S1310 are subsequently repeated to implement the processing and screen transitions of the web app.

Figure 14:
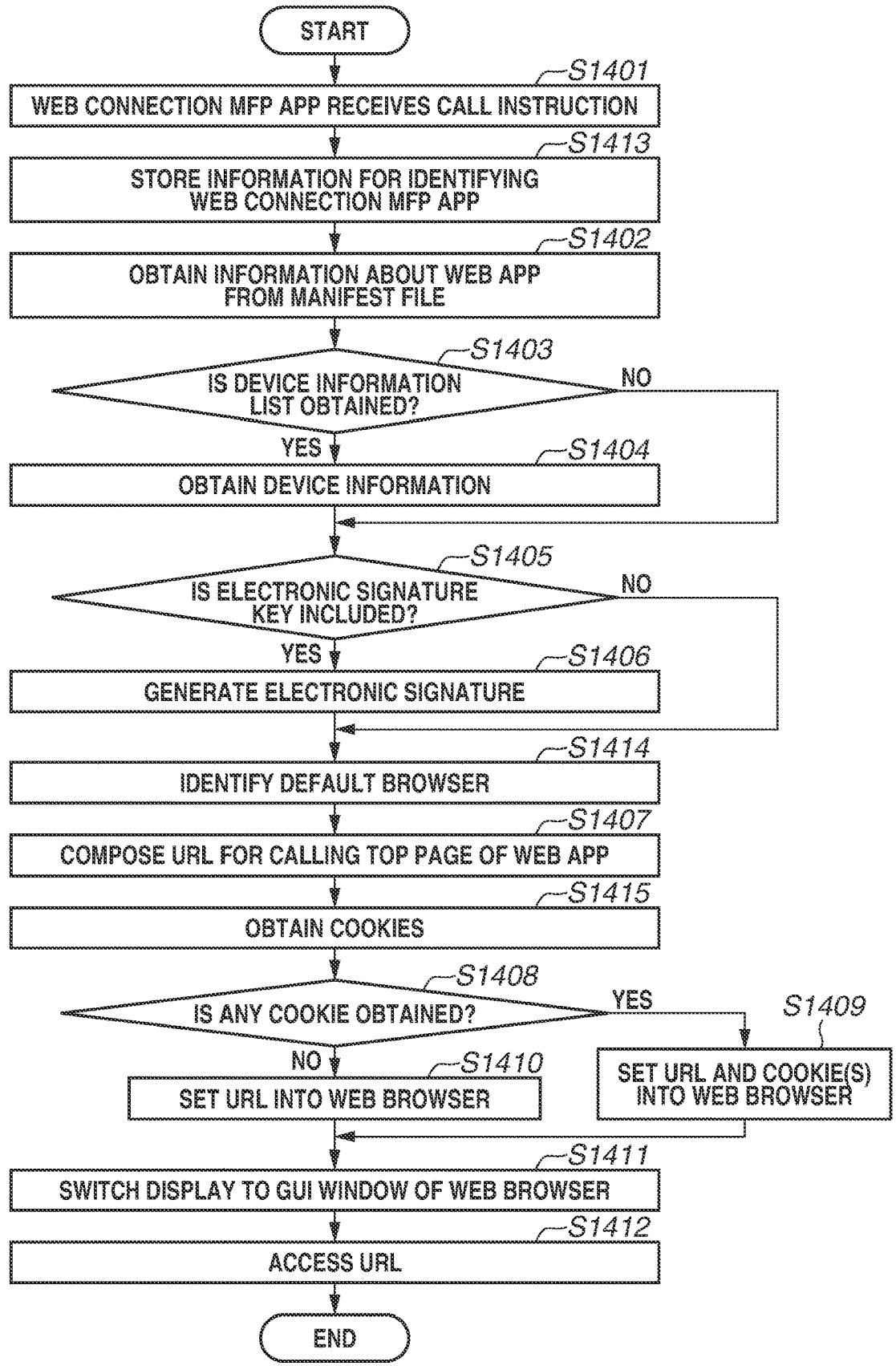
FIG. 14 is a flowchart illustrating an example of processing by the MFP according to the exemplary embodiment.

FIG. 14 is a flowchart for describing processing when a web connection MFP app calls the top page of the web app. The steps in the flowchart of FIG. 14 are implemented by the CPU 201 reading a program stored in the HDD 204 of the MFP 110 into the RAM 203 and analyzing and executing the program. The flowchart of FIG. 14 illustrates the processing of steps S1301 to S1303 of FIG. 13 in detail. Step S1301 of FIG. 13 corresponds to step S1401 of FIG. 14. Steps S1301 and step S1302 of FIG. 13 correspond to steps S1402 to S1411 and S1413 to S1415 of FIG. 14. Step S1303 of FIG. 13 corresponds to step S1412 of FIG. 14.

In step S1401, the menu app cooperation unit 811 of the web connection MFP app receives a call instruction from the menu app 704 receiving the pressing of the GUI button by the user. In step S1413, the connection app management unit 711 stores information for identifying the web connection MFP app (MFP app APP712) for which the call instruction is received. FIG. 9A is a conceptual diagram illustrating the table managed by the connection app management unit 711. In FIG. 9A, the web connection MFP app APP712 is the called app.

In step S1402, the web browser cooperation unit 812 obtains the web application URL 903 and the device information list 905, which are information about the web app, from the manifest file 801. Depending on the web connection MFP app, the device information list 905 is sometimes undefined in the manifest file 801. In such a case, the web browser cooperation unit 812 obtains only the defined information.

In step S1403, if the device information list 905 is obtained in step S1402 (YES in step S1403), the processing proceeds to step S1404. In step S1404, the device information acquisition unit 813 obtains the device information listed in the device information list 905. In the case of the manifest file 801 illustrated in FIG. 6B, the device information acquisition unit 813 obtains device information corresponding to user_id, device_id, device_model, encrypt_pdf, and print_service_ver. The ID of the user logged in on the MFP 110 is indicated by user_id. The device ID of the MFP 110 is indicated by device_id. The model of the MFP 110 is indicated by device_model. A status whether an encrypted Portable Document Format (PDF) option is mounted is indicated by encrypt_pdf. The software version of a web service module for requesting the MFP 110 to perform printing from the web app is indicated by print_service_ver. The device information list 905 illustrated in FIG. 6B is just an example, and obtainable device information is not limited thereto.

In step S1405, if the web connection MFP app APP712 includes the electronic signature key 815 (YES in step S1405), the processing proceeds to step S1406. In step S1406, the signature processing unit 814 generates an electronic signature. The signature processing unit 814 calculates a message digest (HMAC value) as the electronic signature by using a hash function, with a signature character string as the message and the electronic signature key 815 as the secret key. The signature character string is a connected character string of the web application URL 903, the system time (hereinafter, time stamp) of the MFP 110, and the device information obtained in step S1404 if any. In step S1414, the browser determination unit 710 identifies the web browser set as the default browser.

In step S1407, the web browser cooperation unit 812 then composes a URL for calling the top page of the web app. If there is any device information obtained in step S1404, the web browser cooperation unit 812 adds the information to the web application URL 903 as a query character string. If there is a time stamp and/or electronic signature obtained in step S1406, the web browser cooperation unit 812 also adds the information to the web application URL 903 as a query character string.

In step S1415, the web browser cooperation unit 812 calls cookie acquisition processing owned by the cookie management unit 816 and obtains cookies. The web browser cooperation unit 812 then passes the obtained cookies to the web browser 705 that is the default browser. Specifically, the web browser cooperation unit 812 identifies the logged-in user managed by the user management unit 708, and obtains the cookies (the values of users, URLs, keys, and values) for the logged-in user. FIG. 9C is a conceptual diagram illustrating a user management table managed by the user management unit 708. FIG. 9D is a conceptual diagram illustrating a cookie management table managed by the cookie management unit 816. According to the present exemplary embodiment, the logged-in user is UserA. The web browser cooperation unit 812 thus obtains only the cookies for UserA in FIG. 9D.

In step S1408, the web browser cooperation unit 812 determines whether any cookie is obtained. If one or more cookies are obtained (YES in step S1408), the processing proceeds to step S1409. If no cookie is obtained (NO in step S1408), the processing proceeds to step S1410.

In step S1409, the web browser cooperation unit 812 sets the composed URL and the cookie(s) into the web browser 705.

In step S1410, the web browser cooperation unit 812 sets the URL composed in step S1407 as a connection destination into the web browser 705. In step S1411, the web browser cooperation unit 812 switches the display of the operation unit 111 from the menu app 704 to the GUI window of the web browser 705. In step S1412, to call the top page of the web app, the web browser 705 displayed on the operation unit 111 accesses the URL set in step S1409 or S1410.

By performing the foregoing processing, the web connection MFP app corresponding to the GUI button specified by the menu app 704 calls the top page of the web app. The cookie(s) passed by the web connection MFP app (MFP app APP712) can be reflected on the display result of the GUI window of the web browser 705.

Figure 16A:
FIGS. 16A and 16B are diagrams each illustrating an example of the GUI displayed on the operation unit of the MFP according to the exemplary embodiment.

FIG. 16A is a conceptual diagram illustrating a GUI window displayed with cookies reflected by using the web browser 705. Username and password input fields are displayed in such a state that the username and the password have already been input.

Figure 16B:
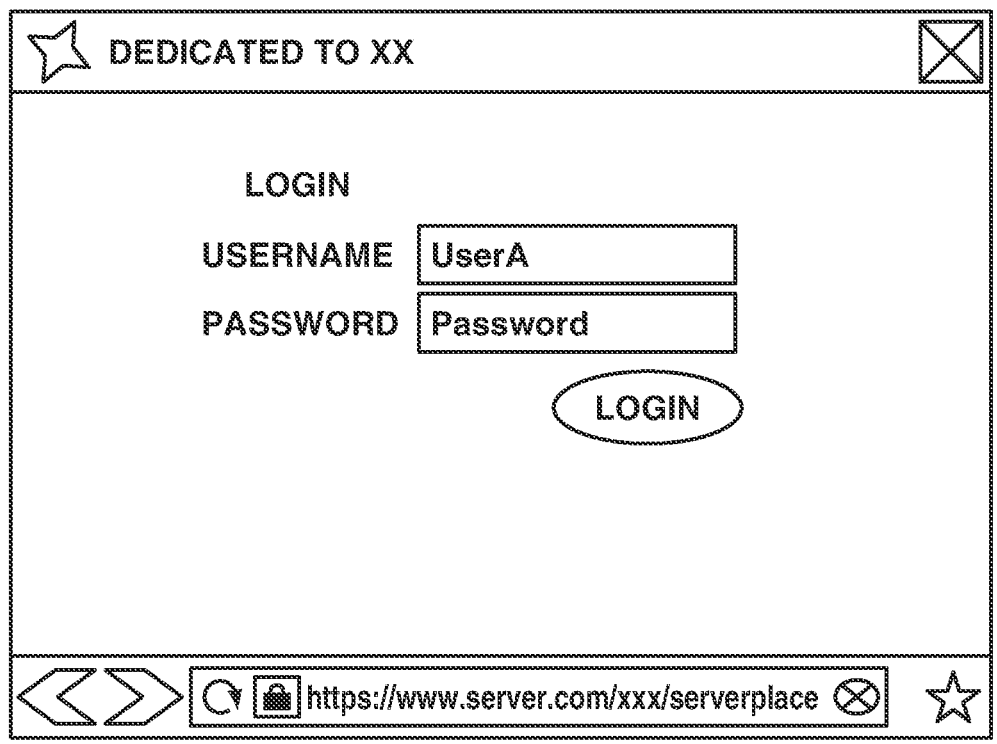

If the setting of the default browser is changed to the web browser 706, the web browser 706 is activated. In such a case, the cookie(s) passed by the web connection MFP app (MFP app APP712) can be reflected on a display result of the GUI window of the web browser 706. FIG. 16B is a conceptual diagram illustrating a GUI window displayed with cookies reflected by using the web browser 706. The username and password input fields are displayed in such a state that the username and the password have already been input.

Processing of Request by Web App Server

Figure 15:
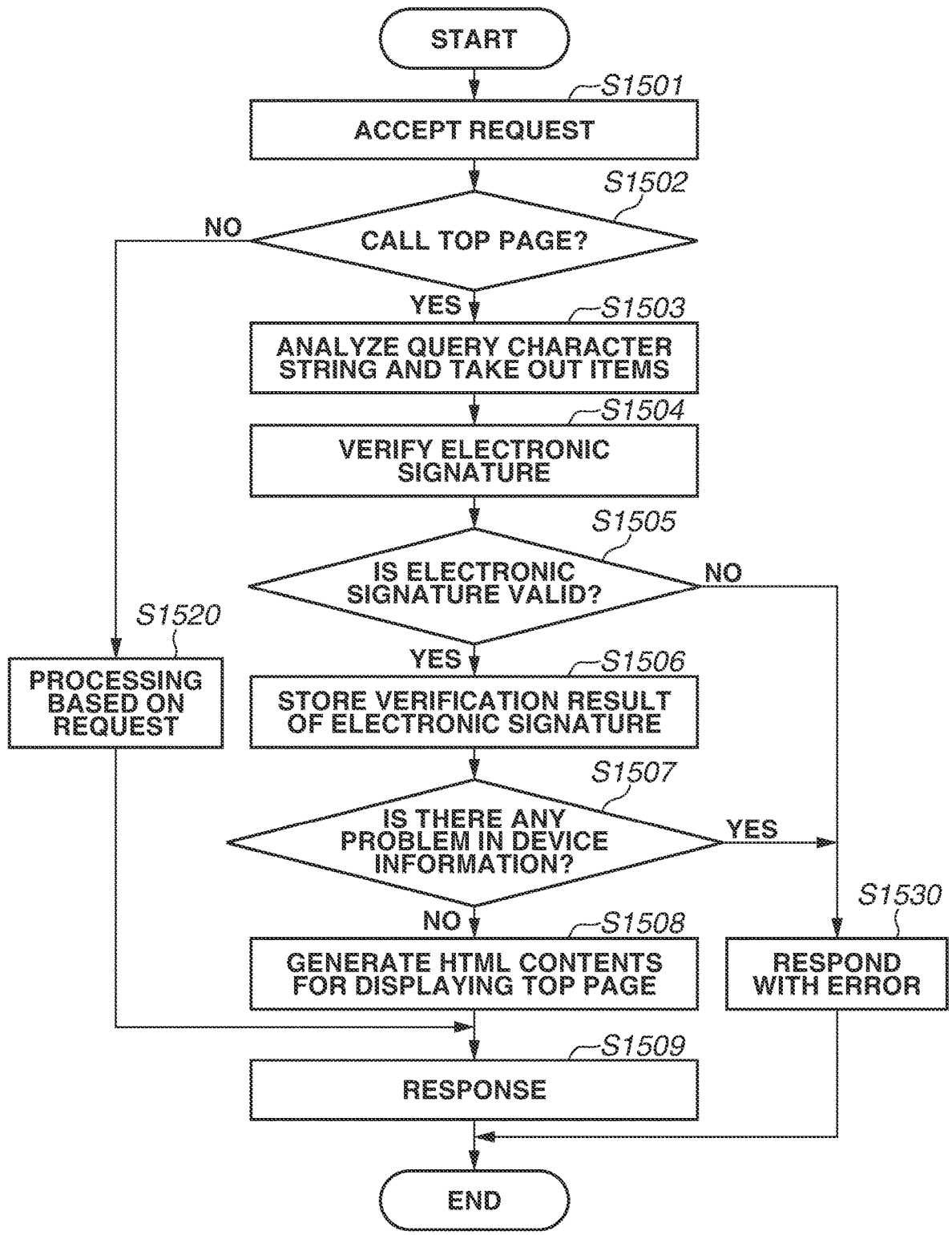
FIG. 15 is a flowchart illustrating an example of processing by the web application server according to the exemplary embodiment.

FIG. 15 is a flowchart for describing processing that the web app server 130 performs when the web app server 130 receives an HTTP-based request from the MFP 110. The steps in the flowchart of FIG. 15 are implemented by the CPU 301 reading a program stored in the HDD 304 of the web app server 130 into the RAM 302 and analyzing and executing the program.

The flowchart of FIG. 15 illustrates details of the processing of steps S1303 to S1305 and steps S1308 to S1310 of FIG. 13. Step S1303 of FIG. 13 corresponds to steps S1501 and S1502 of FIG. 15. Step S1304 of FIG. 13 corresponds to steps S1503 to S1508 of FIG. 15. Step S1305 of FIG. 13 corresponds to step S1509 of FIG. 15. Step S1308 of FIG. 13 corresponds to steps S1501 and S1502 of FIG. 15. Step S1309 of FIG. 13 corresponds to step S1520 of FIG. 15. Step S1310 of FIG. 13 corresponds to step S1509 of FIG. 15.

In step S1501, the communication unit 1001 initially accepts an HTTP-based request from the MFP 110. In step S1502, the web app processing unit 1002 determines whether the accepted request is to call a top page. If the accepted request is to call a top page (YES in step S1502), the processing proceeds to step S1503. If not (NO in step S1502), the processing proceeds to step S1520.

In step S1520, the web app processing unit 1002 performs processing based on the request accepted in step S1501. For example, if the request is to call a scan setting screen, the web app processing unit 1002 generates HTML contents for configuring the scan setting screen. In step S1509, the communication unit 1001 responds to the MFP 110 with the result of processing in step S1520. The processing then ends.

In step S1503, the web app processing unit 1002 analyzes the query character string included in the request accepted in step S1501 and takes out items. According to the present exemplary embodiment, a description will be provided of a case where items including an electronic signature, a time stamp, and device information are obtained.

In step S1504, the signature verification unit 1003 verifies the electronic signature taken out in step S1503. Specifically, the signature verification unit 1003 calculates a message digest by using a hash function to obtain a signature character string as the message and the electronic signature key 1004 as the secret key. If the resulting value coincides with the electronic signature taken out in step S1503, the signature verification unit 1003 determines that the electronic signature is valid. The signature character string is a connected character string of the URL of the request accepted in step S1501 and the time stamp and the device information taken out in step S1503. In other words, the web app server 130 performs processing similar to that the MFP 110 performs in generating an electronic signature in step S1406 of FIG. 14, and checks the validity of the electronic signature based on the determination of whether the results coincide. The results coincide if the electronic signature key 815 owned by the MFP 110 and the electronic signature key 1004 owned by the web app server 130 are the same. If the results coincide, the request can be determined as one from the MFP 110 on which the web connection MFP app is installed.

In step S1505, if the electronic signature is invalid (NO in step S1505), the processing proceeds to step S1530. In step S1530, the web app processing unit 1002 responds to the request source with an error. The processing then ends. If the electronic signature is valid (YES in step S1505), the processing proceeds to step S1506. In step S1506, the web app processing unit 1002 stores the verification result of the electronic signature in association with the session. Since the verification result of the electronic signature is stored in association with the session, communications from the MFP 110 on which the web connection MFP app is installed can be confirmed during processing for subsequent requests. Depending on the web app, the request source can be checked by using information other than an electronic signature. In such a case, steps S1504 to S1506 are skipped, and the web app processing unit 1002 checks other information instead. For example, the web app processing unit 1002 can check the IP address of the request source or the user agent of the web browser. The web app processing unit 1002 can check the device information extracted in step S1503.

In step S1507, the web app processing unit 1002 checks the device information extracted in step S1503. This step is not needed if the web app does not need the device information about the MFP 110. If the web app needs the device information about the MFP 110, the web app processing unit 1002 checks the device information. If there is any problem in the device information (YES in step S1507), the processing proceeds to step S1530. In step S1530, the web app processing unit 1002 responds to the request source with an error. The processing then ends. If there is no problem in the device information (NO in step S1507), the processing proceeds to step S1508. Examples of check items on the device information include the "user ID", "activated option functions", and a "software version".

In step S1508, the web app processing unit 1002 generates HTML contents for displaying the top page. In step S1509, the communication unit 1001 responds to the MFP 110 with the HTML contents generated in step S1508. The processing then ends.

By the procedure described above, the license management of a web app can be implement in a similar manner to that of an MFP app installed on an information processing apparatus. To use a plurality of local MFP apps on the MFP 110, each of the local MFP apps needs to be installed on the MFP 110. Similarly, to use a plurality of web apps on the MFP 110, web connection MFP apps each corresponding to a different one of the web apps need to be installed on the MFP 110. To install MFP apps on the MFP 110, a license is needed for each MFP app to be installed. Both local MFP apps and web connection MFP apps are MFP apps, and the license management thereof can thus be similarly implemented. The license management can be performed in a unified manner as that of MFP app licenses and the convenience of the vendors and administrators improves, compared to a case where the license management of web apps is performed by a server or a case where a license management mechanism dedicated to web apps is provided on the MFP.

Call and Execution of Web Browser

Figure 20:
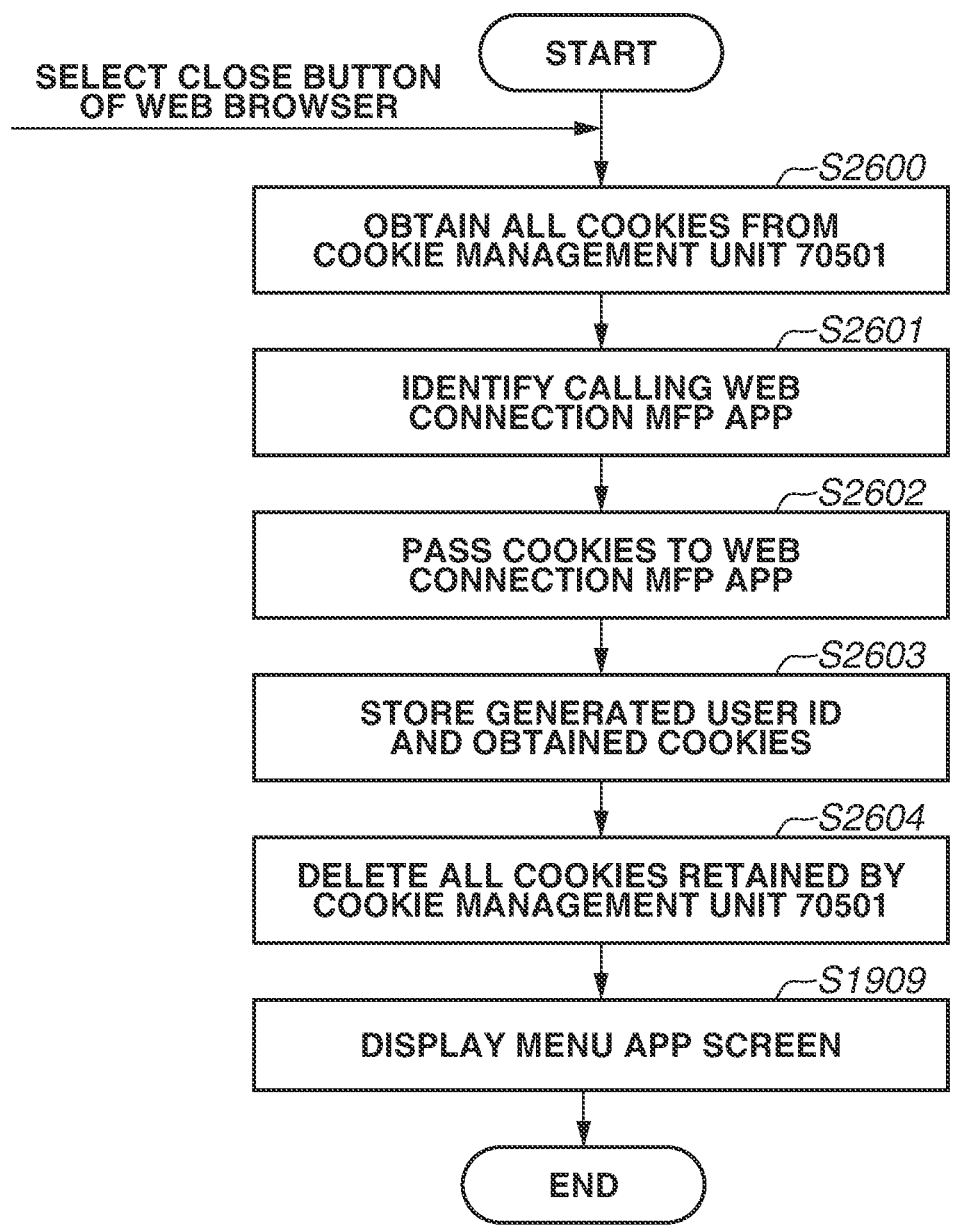
FIG. 20 is a flowchart illustrating an example of processing by the MFP according to the exemplary embodiment.

FIG. 20 is a sequence diagram illustrating a flow of processing for terminating a web browser from the MFP 110. Here, a description will be provided of a case where a close button 2501 on the GUI window (FIG. 16A) of the web browser 705 is selected by the user. The termination processing can also be performed at timing of a state change of the MFP 110 such as logout, reset, and a shift into sleep.

The GUI window of the web browser 705 accepts the pressing of the GUI button 2501 by the user. In step S2600, the web browser 705 obtains all the cookies from the cookie management unit 70501. FIG. 9E is a conceptual diagram illustrating the cookies stored in the cookie management unit 70501. The web browser 705 obtains the values of the keys, and values.

In step S2601, the connection app management unit 711 identifies the calling web connection MFP app. Specifically, the connection app management unit 711 identifies the web connection MFP app on which a call flag is set, by using the table managed by the connection app management unit 711 (FIG. 9A). In the example of FIG. 9A, the MFP app APP712 is identified.

In step S2602, the web browser 705 passes the cookies stored in the web browser 705 to the identified web connection MFP app (MFP app APP712). In step S2603, the identified web connection MFP app (MFP app APP712) calls cookie storage processing owned by the cookie management unit 816 by using the obtained cookies as arguments. By the cookie storage processing, a logged-in user ID to be added to the cookies (URL, keys, and values) obtained from the web browser is generated, and the resultant value is stored into the management table retained by the cookie management unit 816. The generated and stored values are the user ID, URLs, keys, and values. FIG. 9D illustrates specific examples of the values. In step S2604, the web browser 705 deletes all the cookies retained by the cookie management unit 70501.

In step S1909, the menu app 704 displays the menu screen. An example of the menu screen displayed in step S1909 is the screen illustrated in FIG. 12A.

In such a manner, the specific calling MFP app APP712 stores the cookies obtained from the default browser that is either the web browser 705 or the web browser 706.

According to the present exemplary embodiment, cookies input into a browser (A) before a change of the default browser are inherited to a browser (B) after a change of the default browser by using a web connection MFP app. This consequently eliminates the need to reenter an authentication ID and a password, and provides the effect of improving user convenience.

Specifically, the browser (A) is initially set as the default browser. A web connection MFP app intended for a frequently used connection destination is installed on the image forming apparatus. In using the web connection MFP app, the user inputs entries into input fields (such as username) needed by the connection destination on the default browser (browser (A)). The browser (A) stores the input cookies. The setting of the default browser is then changed to the browser (B) by using a setting function of the image forming apparatus. The cookies retained by the browser (A) can be inherited to the default browser (browser (B)) by using the web connection MFP app.

According to the first exemplary embodiment, the plurality of browsers is described to have no difference in the cookie format. A second exemplary embodiment describes an example in which a plurality of browsers has different cookie formats, and cookies need to be converted when shared between the browsers. It is, for example, a case where a browser A stores cookies in a type 1 format, and a browser B stores cookies in a type 2 format. In such a case, the cookies of the browser A are not simply usable by the browser B. The cookies of the browser A are converted into a format that the cookies can be used by the browser B. Only differences from the first exemplary embodiment will be described below.

Figure 22:
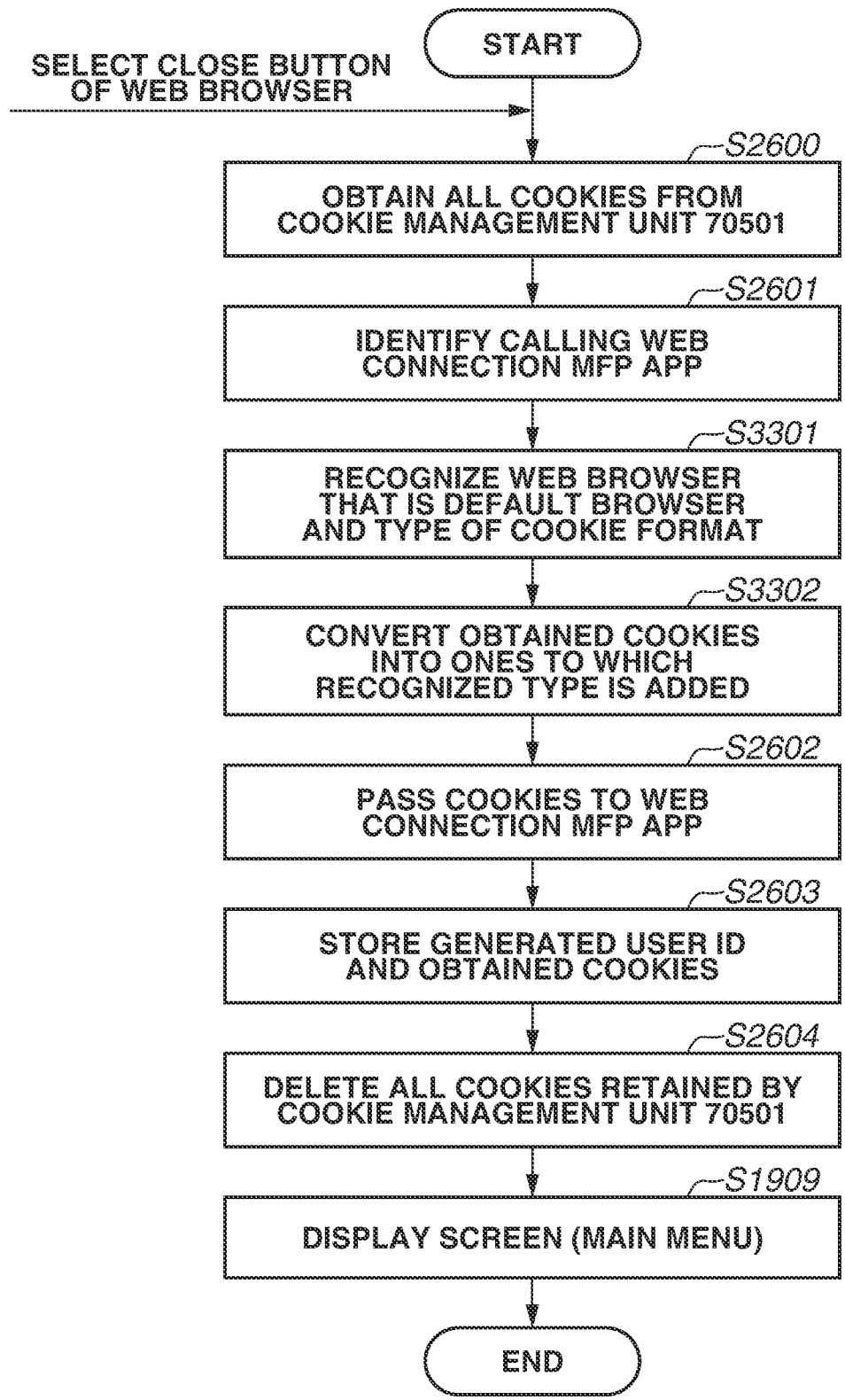
FIG. 22 is a flowchart illustrating an example of processing by the MFP according to the exemplary embodiment.

FIG. 22 is a sequence diagram illustrating a processing procedure for terminating a web browser from the MFP 110. A difference from the first exemplary embodiment is that steps S3301 and S3302 are added to the processing of FIG.

20. Here, processing for a case where the close button 2501 of the GUI window (FIG. 16A) of the web browser 705 is selected by the user will be described as an example.

In step S3301, the format conversion unit 709 recognizes the web browser that is the default browser and the type of cookie format. According to the present exemplary embodiment, the web browser 705 is the default browser. Type information is recognized as 1. In step S3302, the format conversion unit 709 converts the obtained cookie into a format that the recognized specific type is added. FIG. 17C is a diagram illustrating examples of the converted cookies.

A description will be provided of processing for calling and executing a web app after the GUI button 1207 is pressed and the web browser 706 is set as the default browser.

Figure 21:
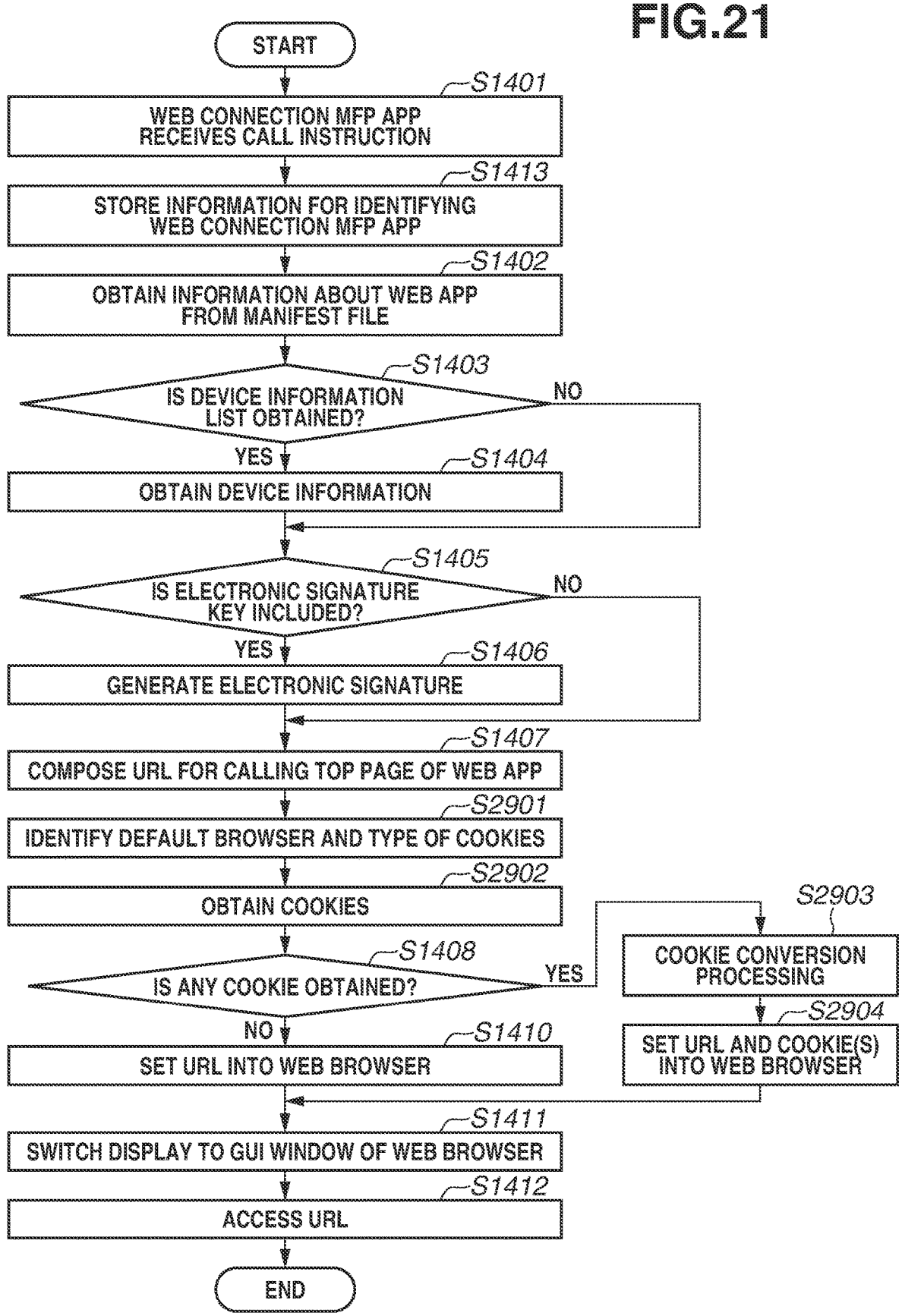
FIG. 21 is a flowchart illustrating an example of processing by an MFP according to another exemplary embodiment.

FIG. 21 is a flowchart for describing processing when a web connection MFP app calls the top page of the web app. FIG. 21 is different from FIG. 14 in steps S2901, S2902, S2903, and S2904. The other steps are similar to those of FIG. 14. Only differences will be described below.

In step S2901, the web browser cooperation unit 812 calls default browser identification processing provided by the browser determination unit 710, and identifies the web browser set as the default browser and the type of cookies used by the web browser. FIG. 17A is a diagram illustrating a default browser management table managed by the setting management unit 707. The web browser cooperation unit 812 identifies the default browser and the type of cookies by referring to the default browser management table. According to the present exemplary embodiment, the web browser cooperation unit 812 recognizes the web browser 706 as the default browser and type 2 as the type of cookies.

In step S2902, the web browser cooperation unit 812 calls the cookie acquisition processing provided by the cookie management unit 816 and obtains cookies. The web browser cooperation unit 812 identifies the logged-in user and obtains the cookies of the identified user. Specifically, the web browser cooperation unit 812 identifies the values of users, URLs, keys, values, and types corresponding to the logged-in user in the management table, and stores the values of the users, URLs, keys, values, and types into a work memory as cookies. FIG. 17B is a conceptual diagram illustrating the cookie management table managed by the cookie management unit 816.

In step S2903, the web browser cooperation unit 812 passes the recognized type 2 and the cookies stored in the work memory to the format conversion unit 709. The format conversion unit 709 performs conversion to match the type values in the work memory with the recognized type 2. The web browser cooperation unit 812 recognizes the converted cookies.

In step S2904 (like S1409), the web browser cooperation unit 812 sets the composed URL and the cookies recognized in step S2903 into the web browser 705.

This provides the effect of passing converted cookies if the format of the cookies stored by the web browser cooperation unit 812 is different from that of the cookies of the default browser.

In such a manner, cookies are inherited by using a web connection MFP app even in the case of switching between different browsers (not limited to two in number and may be plural). This eliminates the need for reentry and provides the effect of enhancing user convenience.

In the foregoing exemplary embodiments, two different browsers are described to be installed. However, three or more browsers can be installed and switched between. While two web connection MFP apps are described to be used, three or more web connection MFP apps can be used.

A web connection MFP app can be a different entity that retains a URL for accessing a web app and does not specify the browser to be used (is not browser-dependent). For example, if the license of a web app does not need to be managed, a shortcut that retains the URL for accessing the web app and does not specify the browser to be used can be used.

As described above, according to the foregoing exemplary embodiments, the user convenience of an apparatus on which a plurality of browsers is installed is improved by enabling cookie information about one browser to be used by another browser.

Other Embodiments

Embodiment(s) can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While exemplary embodiments have been described, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2018-048251, filed Mar. 15, 2018, which is hereby incorporated by reference herein in its entirety.

What is claimed is:
1. An information processing apparatus comprising:
at least one memory storing a plurality of browsers, wherein each of the plurality of browsers can store respective cookie information; and
a storing unit configured to store cookie information to be used in the plurality of browsers;
at least one processor configured to cause the information processing apparatus to:
detect a call for a browser of the plurality of browsers or termination of a browser of the plurality of browsers;

obtain the stored cookie information from the storing unit and hold the cookie information in the called browser in a case where the call for the browser of the plurality of browsers is detected;

use the cookie information held in the browser; and store the cookie information held in the browser in the storing unit and delete the cookie information held in the browser in a case where the termination of the browser of the plurality of browsers is detected, wherein the stored cookie information is obtained from the storing unit, the cookie information is held in a first browser, and the cookie information held in the first browser is used, in a case where a call for the first browser of the plurality of browsers is detected, and wherein the stored cookie information is obtained from the storing unit, the cookie information is held in a second browser, and the cookie information held in the second browser is used, in a case where a call for the second browser of the plurality of browser is detected.

2. The information processing apparatus according to claim 1, wherein, in a case where the first browser is terminated, the stored cookie information is obtained from the storing unit.

3. The information processing apparatus according to claim 1, wherein the at least one processor further causes the information processing apparatus to set a browser to be used as a default browser from among the plurality of browsers, wherein, in a case where the set browser is used, the cookie information is passed to the set browser.

4. The information processing apparatus according to claim 3, wherein the at least one processor further causes the information processing apparatus to:

obtain a call instruction for an application that does not specify a browser to be used and retains Uniform Resource Locator (URL) information about an access destination; and access the URL information retained by the application by using the set browser.

5. The information processing apparatus according to claim 1, wherein the at least one processor further causes the information processing apparatus to convert cookie information, and in a case where the second browser from among the plurality of browsers is used, pass the converted cookie information to the second browser.

6. A cookie information management method of an information processing apparatus including a plurality of browsers wherein each of the plurality of browsers can store respective cookie information, the cookie information management method comprising:

storing cookie information to be used in the plurality of browsers;

detecting a call for a browser of the plurality of browsers or termination of a browser of the plurality of browsers;

obtaining the stored cookie information from the storing and holding the cookie information in the called browser in a case where the call for the browser of the plurality of browsers is detected;

using the cookie information held in the browser; and storing the cookie information held in the browser in the storing and deleting the cookie information held in the browser in a case where the termination of the browser of the plurality of browsers is detected, wherein the stored cookie information is obtained from the storing, the cookie information is held in a first browser, and the cookie information held in the first browser is used, in a case where a call for the first browser of the plurality of browsers is detected, and wherein the stored cookie information is obtained from the storing, the cookie information is held in a second browser, and the cookie information held in the second browser is used, in a case where a call for the second browser of the plurality of browser is detected.

7. The cookie information management method according to claim 6, wherein in a case where the first browser is terminated, the stored cookie information is obtained from the storing.

8. The cookie information management method according to claim 6, further comprising setting a browser to be used as a default browser from among the plurality of browsers, wherein in a case where the set browser is used, cookie information is passed to the set browser.

9. The cookie information management method according to claim 8, further comprising:

obtaining a call instruction for an application that does not specify a browser to be used and retains URL information about an access destination; and accessing the URL information retained by the application by using the set browser.

10. The cookie information management method according to claim 6, further comprising converting cookie information, and in a case where the second browser from among the plurality of browsers is used, passing the converted cookie information to the second browser.

* * * * *